United States Patent
Iwai et al.

(10) Patent No.: US 7,457,650 B2
(45) Date of Patent: Nov. 25, 2008

(54) PORTABLE RADIO COMMUNICATION APPARATUS PROVIDED WITH BOOM PORTION WITH THROUGH HOLE

(75) Inventors: Hiroshi Iwai, Katano (JP); Shinji Kamaeguchi, Kadoma (JP); Kenichi Yamada, Yokohama (JP); Toshihiro Asahina, Yokohama (JP); Atsushi Yamamoto, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 573 days.

(21) Appl. No.: 10/629,634

(22) Filed: Jul. 30, 2003

(65) Prior Publication Data

US 2005/0075082 A1    Apr. 7, 2005

(30) Foreign Application Priority Data

Jul. 31, 2002    (JP)    ............................ P2002-222785
Jan. 28, 2003    (JP)    ............................ P2003-018752

(51) Int. Cl.
H04B 1/38    (2006.01)

(52) U.S. Cl. .................. 455/575.7; 455/83; 455/90.3; 455/97; 455/575.1; 455/575.3; 343/702; 343/704; 343/767; 343/866

(58) Field of Classification Search ............. 455/575.1, 455/575.5, 575.6, 575.7, 97, 90.3, 83, 575.3; 343/700, 702, 767, 704, 876, 866
See application file for complete search history.

(56) References Cited

U.S. PATENT DOCUMENTS

| | | | |
|---|---|---|---|
| 5,995,052 A | 11/1999 | Sadler et al. | |
| D444,454 S | 7/2001 | Hanna et al. | |
| 6,587,698 B1 * | 7/2003 | Dosch | 455/558 |
| 6,625,469 B1 | 9/2003 | Hwang et al. | |
| 6,768,464 B1 * | 7/2004 | Shoji et al. | 343/702 |
| 6,921,170 B1 * | 7/2005 | Nevermann | 353/28 |
| 2001/0020335 A1 * | 9/2001 | Busch | 33/645 |
| 2001/0030627 A1 | 10/2001 | Andersson | |
| 2001/0036136 A1 | 11/2001 | Fukushima et al. | |
| 2002/0031060 A1 | 3/2002 | Mashimo et al. | |
| 2003/0035353 A1 | 2/2003 | Kim | |

(Continued)

FOREIGN PATENT DOCUMENTS

DE    100 53 817    5/2002

(Continued)

OTHER PUBLICATIONS

European Office Action (in English language) issued Jun. 21, 2007 in European Patent Application No. 03017351.2-1248.

*Primary Examiner*—Tuan A Pham
(74) *Attorney, Agent, or Firm*—Wenderoth, Lind & Ponack, L.L.P.

(57) ABSTRACT

A portable radio communication apparatus is provided with a boom portion having both ends connected with a housing of the portable radio communication apparatus and having a central portion located between both ends. In the portable radio communication apparatus, at least one through hole is formed between the boom portion and the housing. The boom portion includes a central portion and two end portions. The central portion extends in parallel to a width direction of the portable radio communication apparatus, and the two end portions are bent respectively from both ends of the central portion.

19 Claims, 34 Drawing Sheets

U.S. PATENT DOCUMENTS

2003/0086345 A1   5/2003  Ueki
2003/0184494 A1*  10/2003 Yagi ........................... 343/876
2004/0001022 A1*  1/2004  Silzer, Jr. .................... 343/702

FOREIGN PATENT DOCUMENTS

| EP | 1 087 461   | 3/2001  |
| EP | 1 099 407   | 5/2001  |
| JP | 6-334557    | 12/1994 |
| JP | 8-4726      | 2/1996  |
| JP | 3047306     | 1/1998  |
| JP | 11-163628   | 6/1999  |
| JP | 2002-516503 | 6/2000  |
| JP | 2000-322818 | 11/2000 |
| JP | 2001-119463 | 4/2001  |
| WO | 99/60660    | 11/1999 |
| WO | 01/09976    | 2/2001  |
| WO | 02 31807    | 4/2002  |
| WO | 02/089123   | 11/2002 |

* cited by examiner

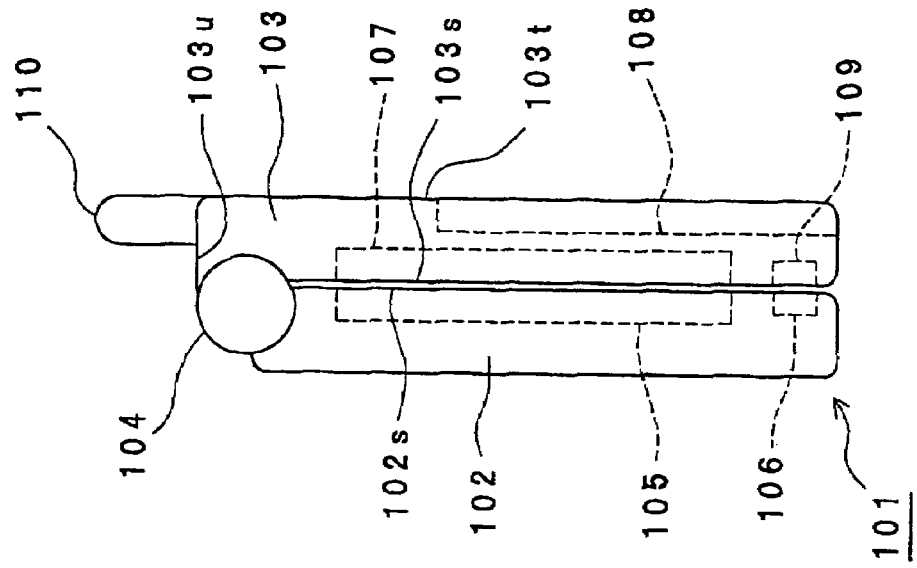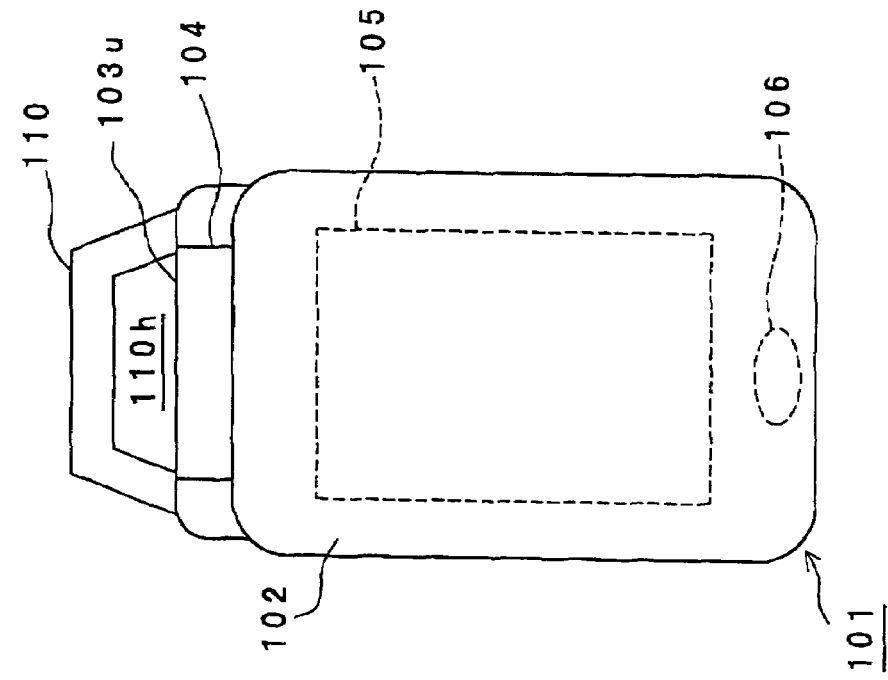

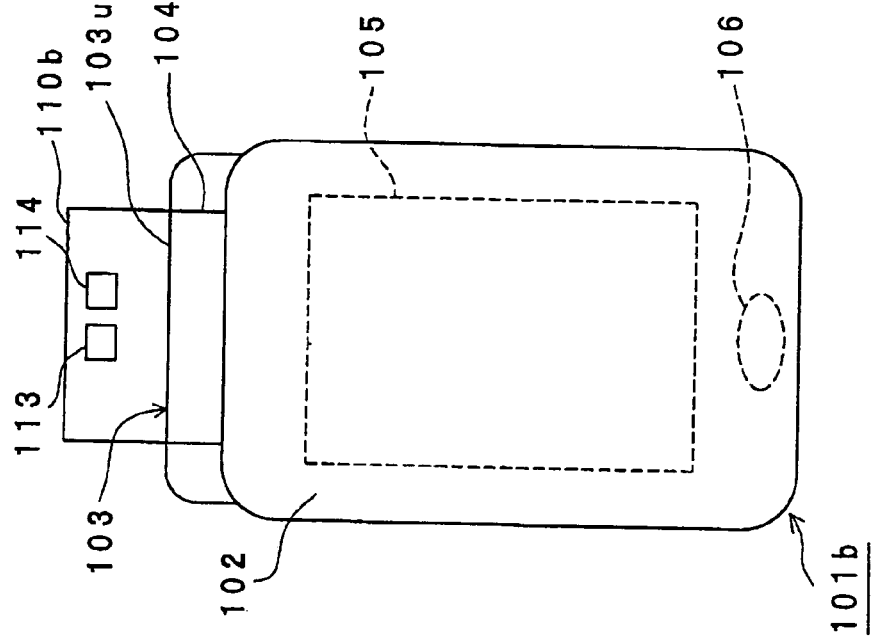
Fig. 4A FIRST MODIFIED PREFERRED EMBODIMENT OF FIRST PREFERRED EMBODIMENT
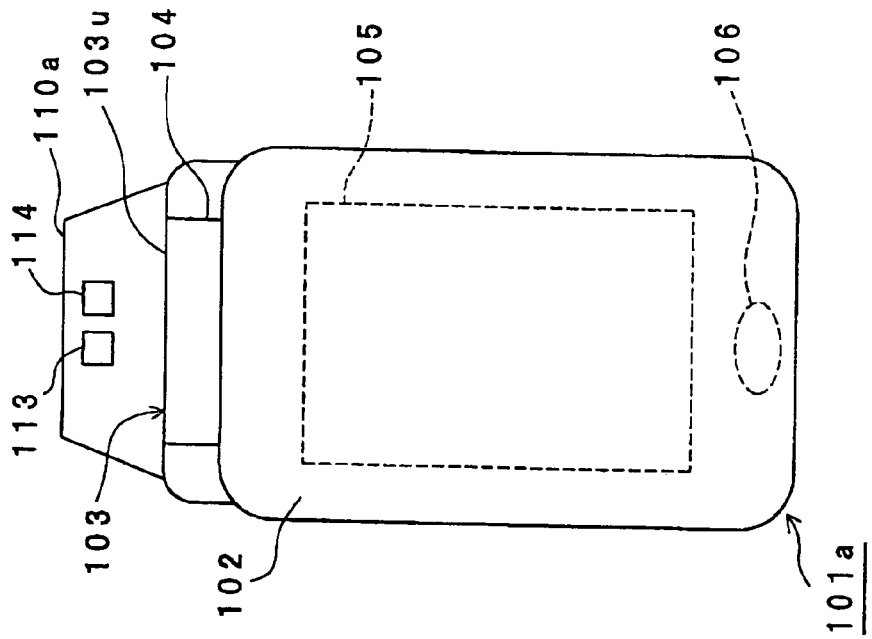
Fig. 4B SECOND MODIFIED PREFERRED EMBODIMENT OF FIRST PREFERRED EMBODIMENT

SECOND PREFERRED EMBODIMENT

THIRD PREFERRED EMBODIMENT

FOURTH PREFERRED EMBODIMENT

FIFTH PREFERRED EMBODIMENT

SIXTH PREFERRED EMBODIMENT

Fig. 10A SEVENTH PREFERRED EMBODIMENT

EIGHTH PREFERRED EMBODIMENT

NINTH PREFERRED EMBODIMENT

MODIFIED PREFERRED EMBODIMENT
OF NINTH PREFERRED EMBODIMENT

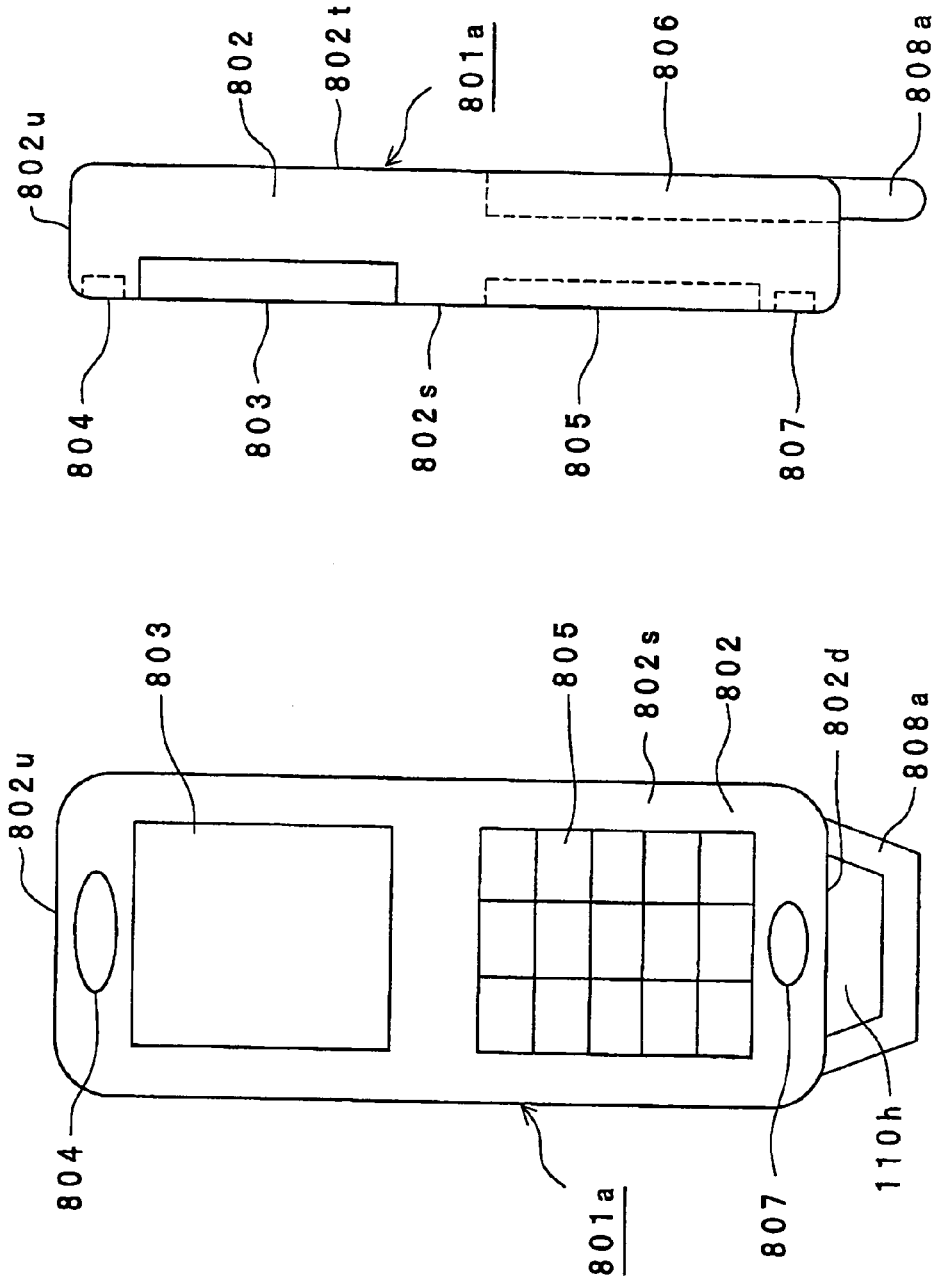

ELEVENTH PREFERRED EMBODIMENT

TWELFTH PREFERRED EMBODIMENT

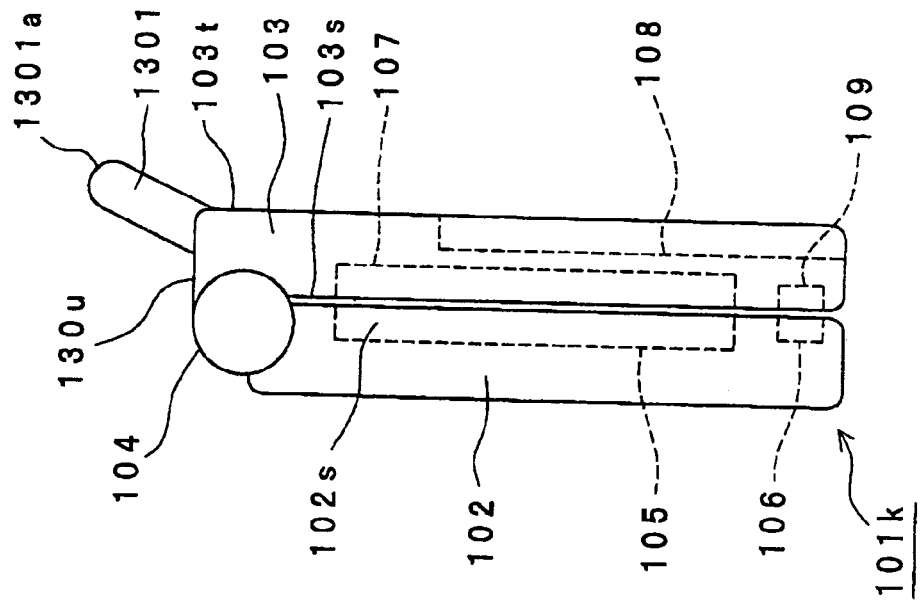
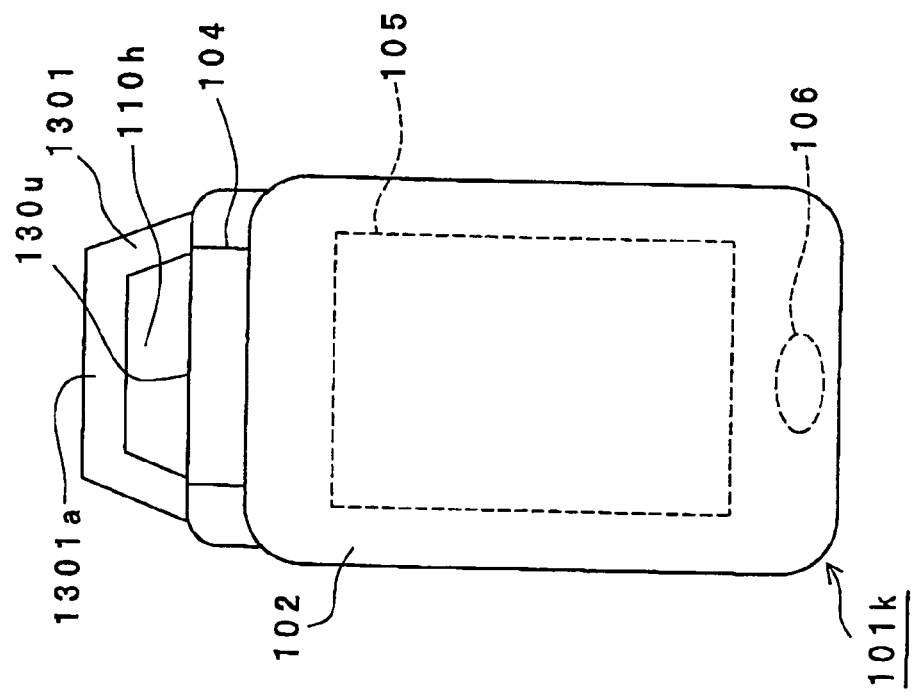

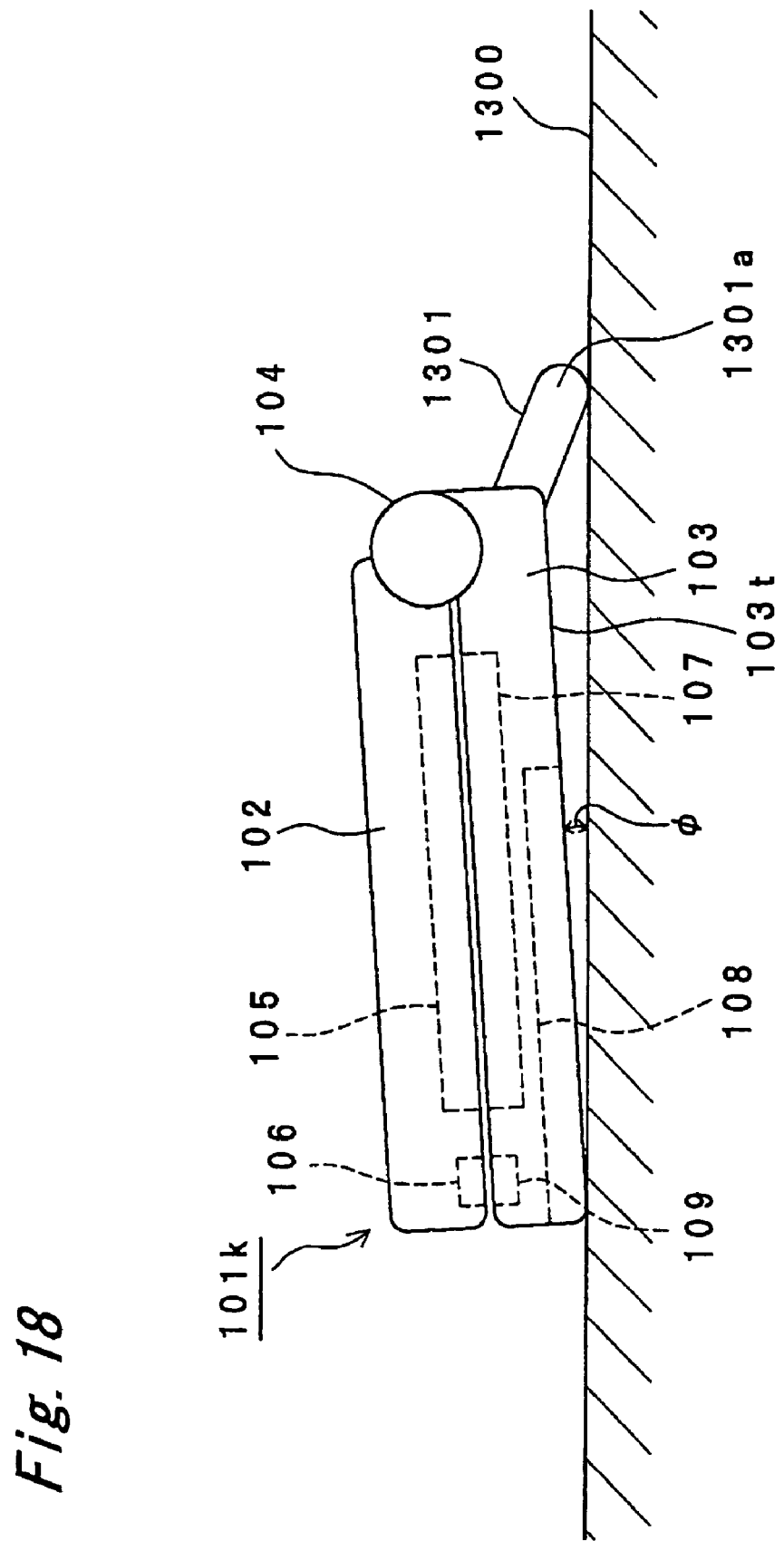

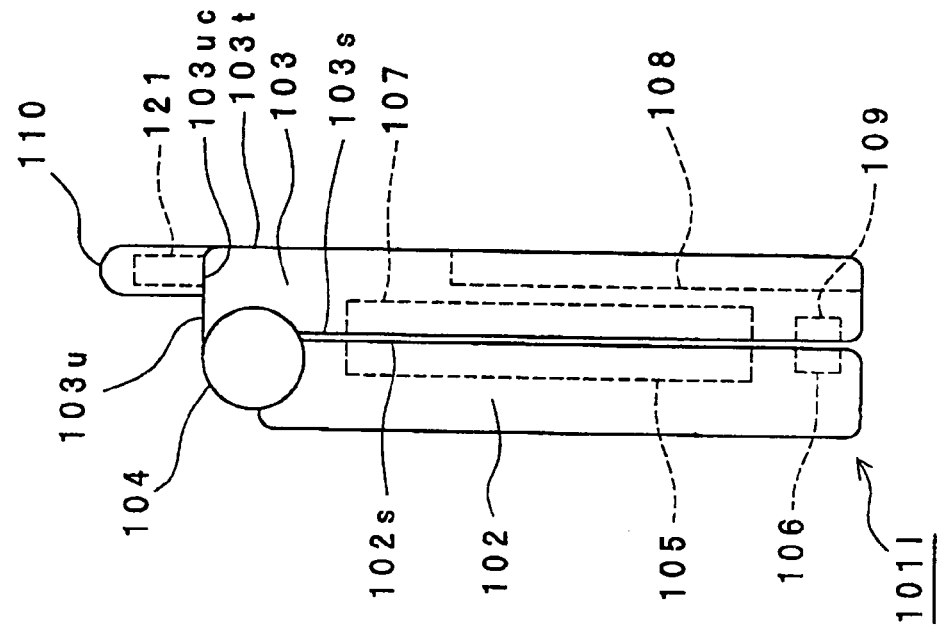
Fig. 19A FOURTEENTH PREFERRED EMBODIMENT
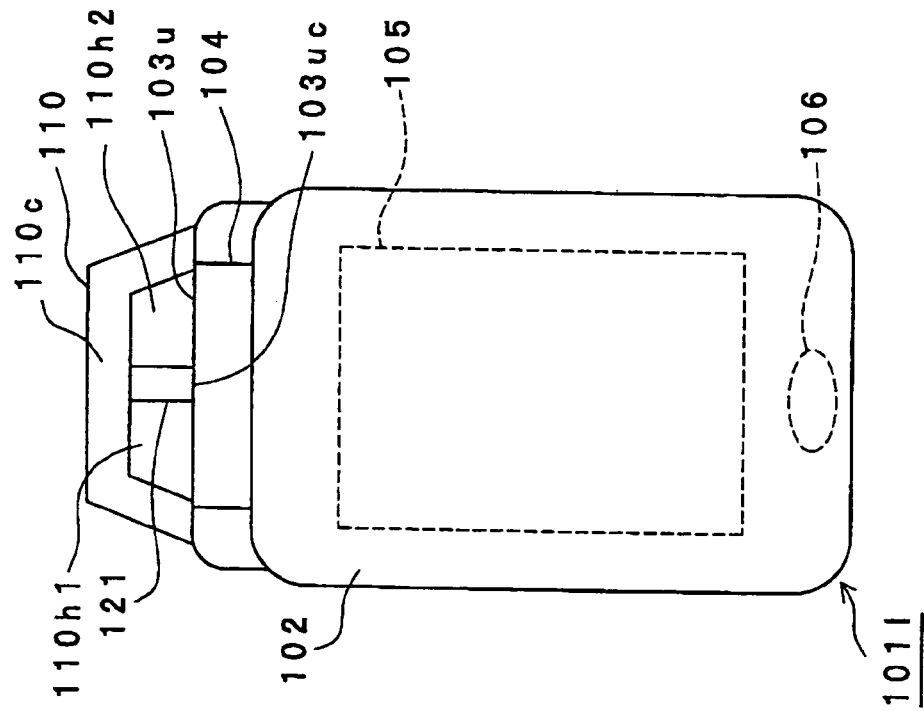
Fig. 19B

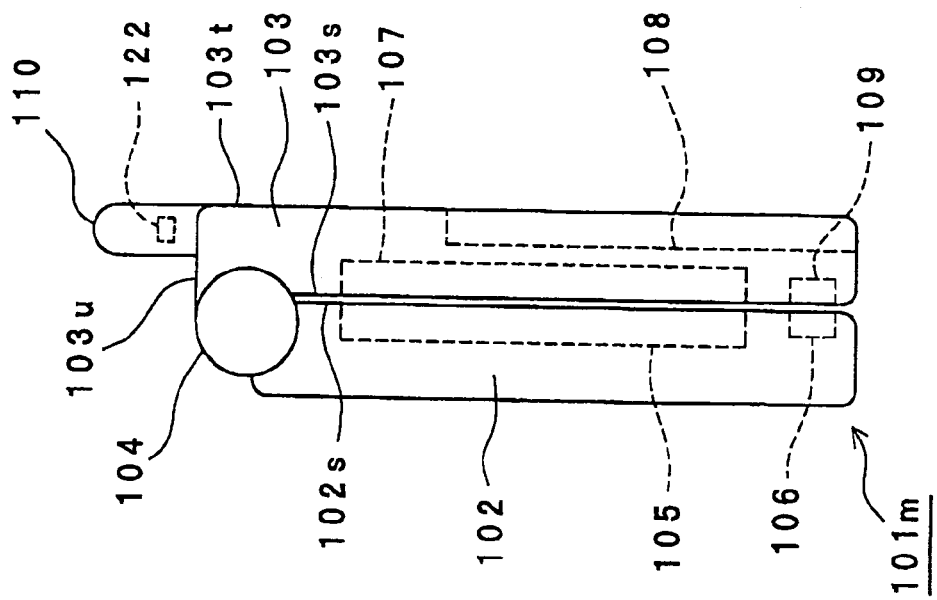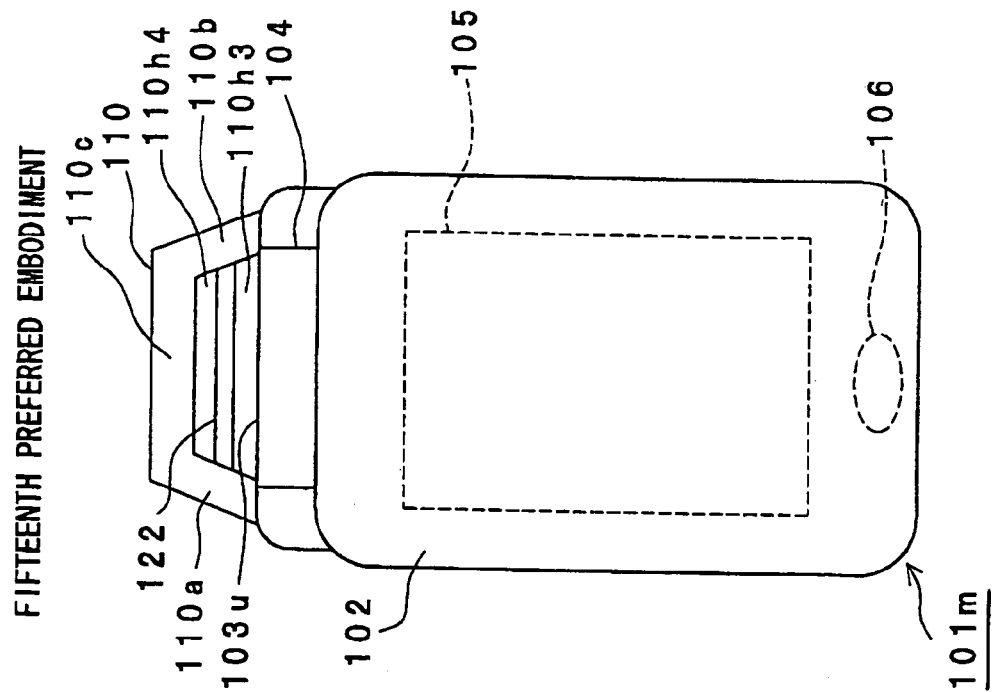

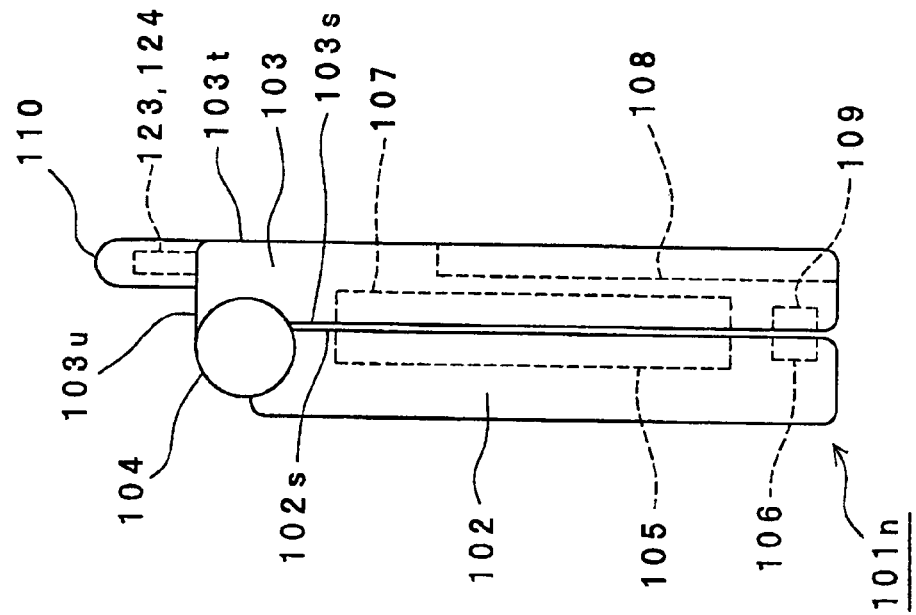
Fig. 22A SIXTEENTH PREFERRED EMBODIMENT
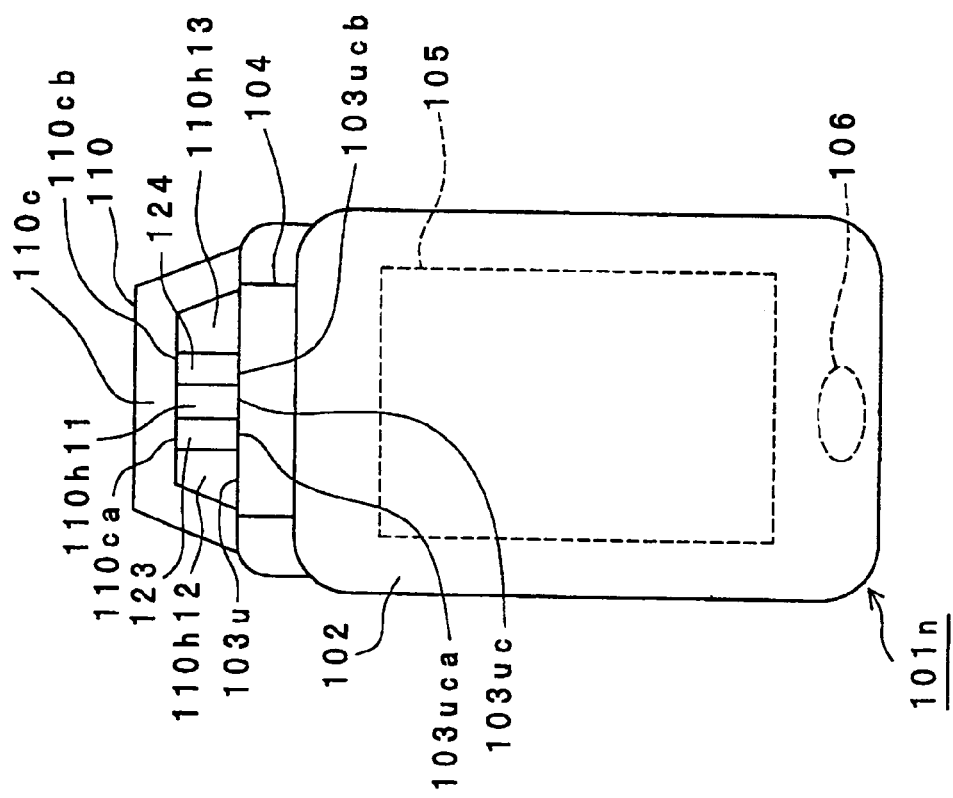
Fig. 22B

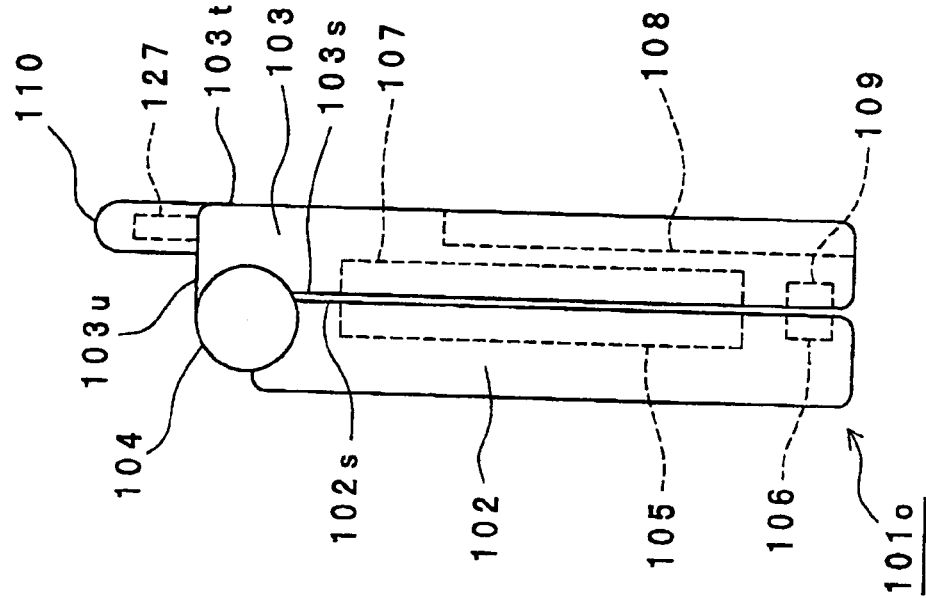
Fig. 24B
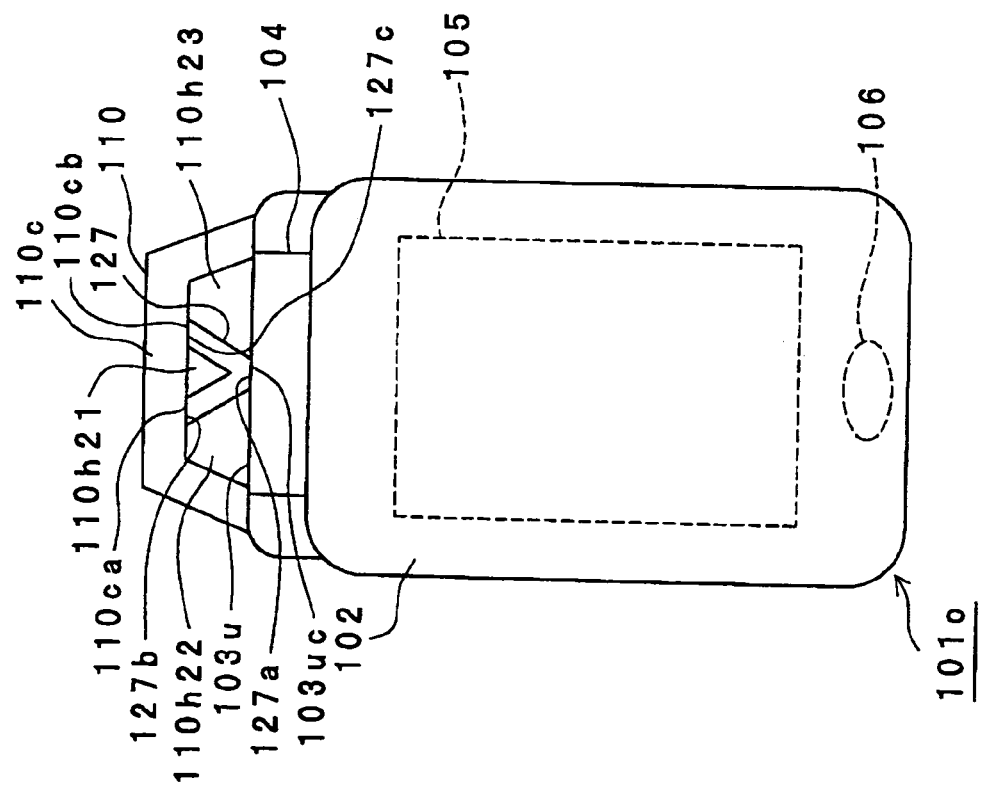
Fig. 24A SEVENTEENTH PREFERRED EMBODIMENT

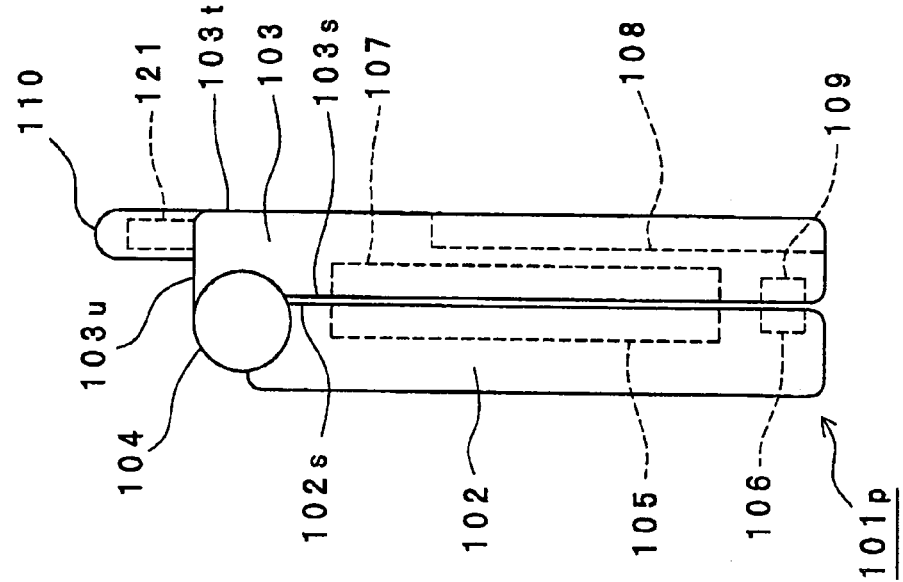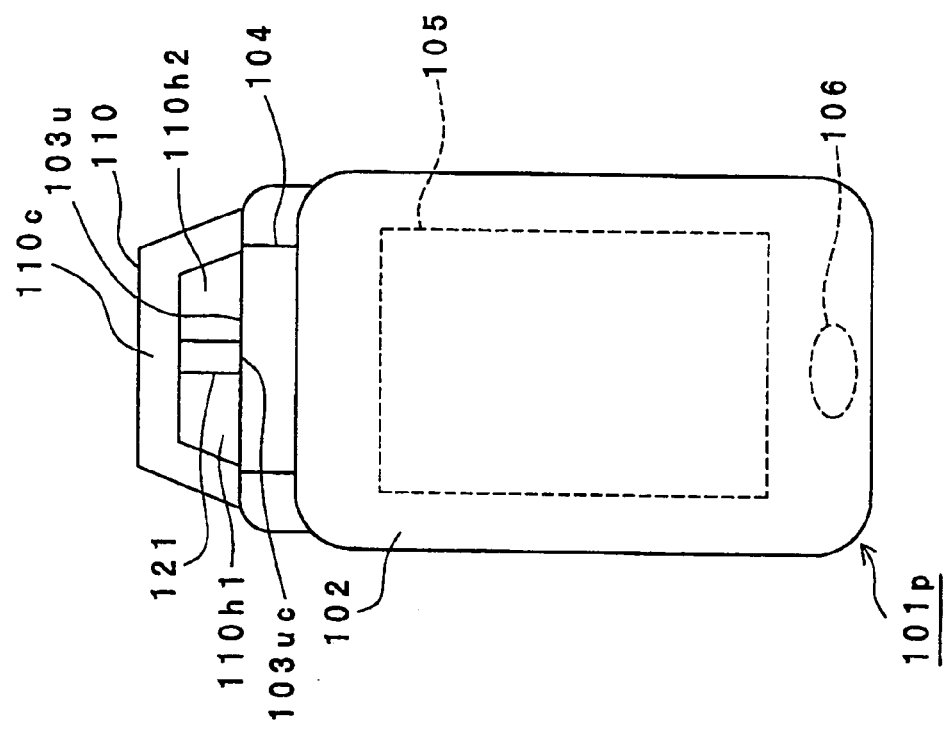

NINETEENTH PREFERRED EMBODIMENT

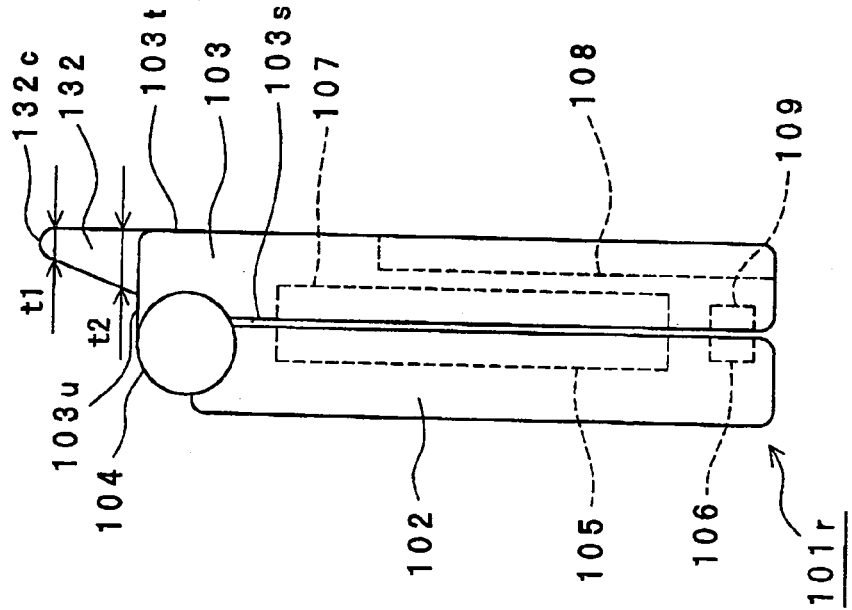
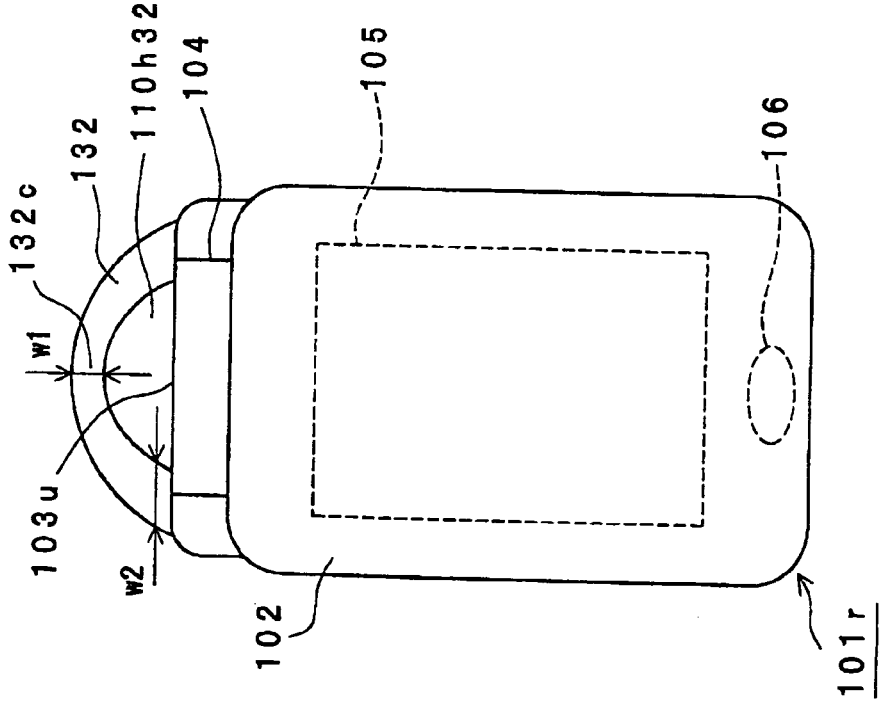

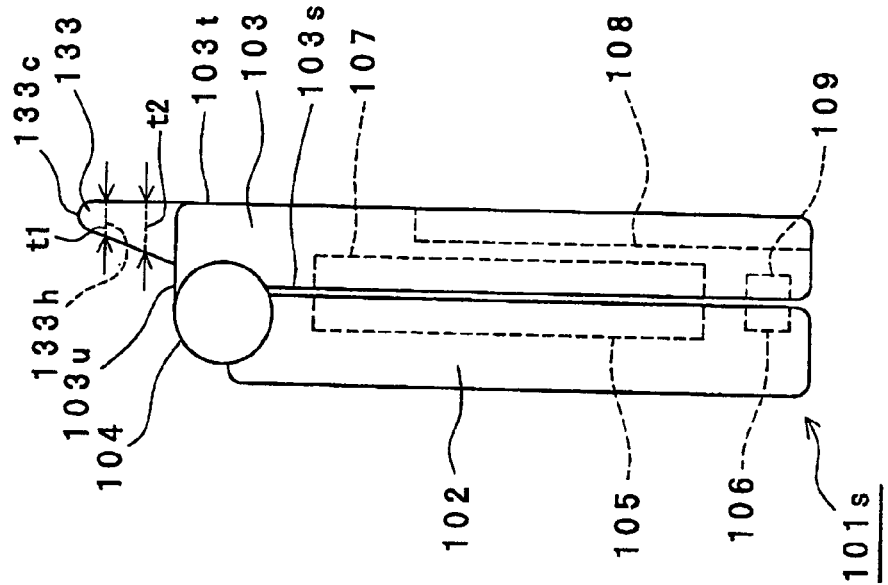
Fig. 29A TWENTY-FIRST PREFERRED EMBODIMENT
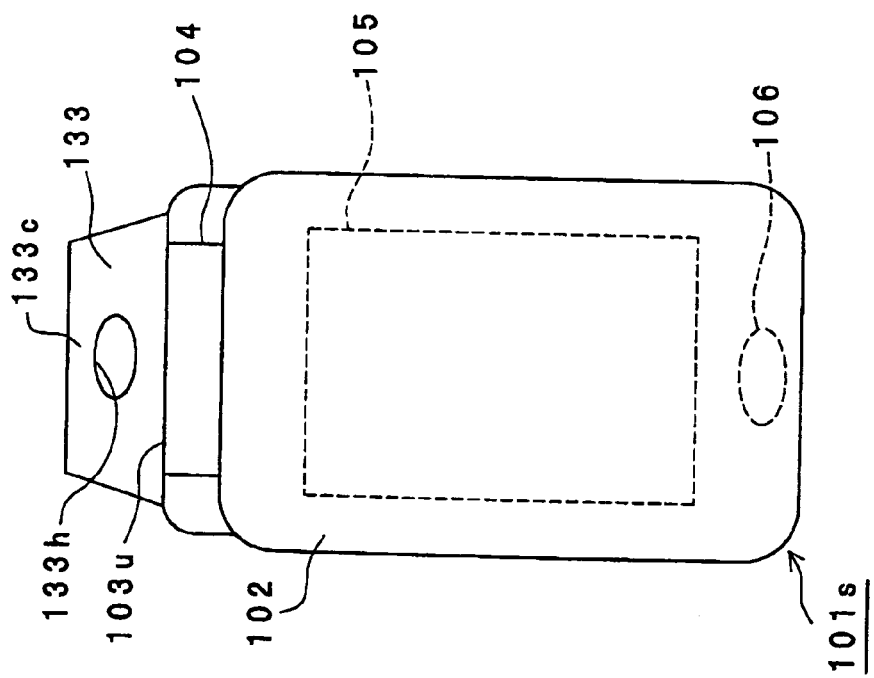
Fig. 29B

MODIFIED PREFERRED EMBODIMENT OF TWENTY-FIRST PREFERRED EMBODIMENT

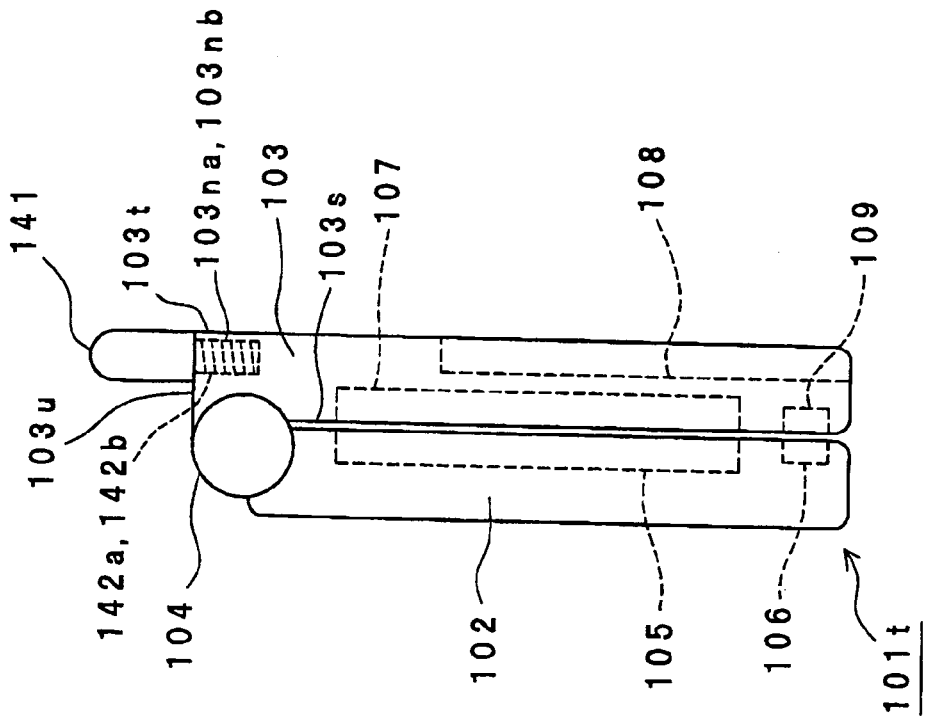
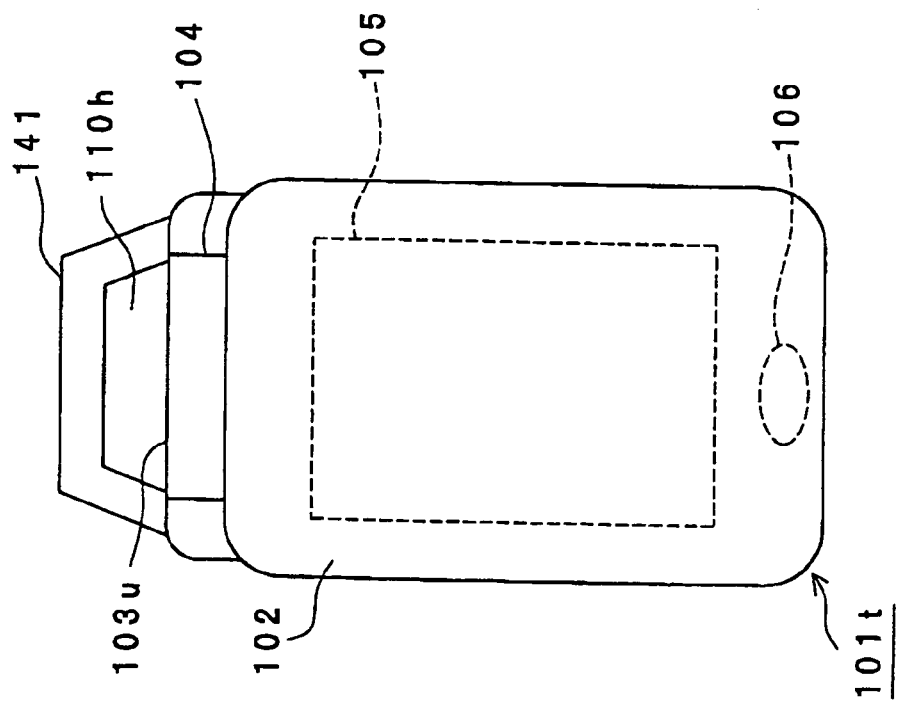

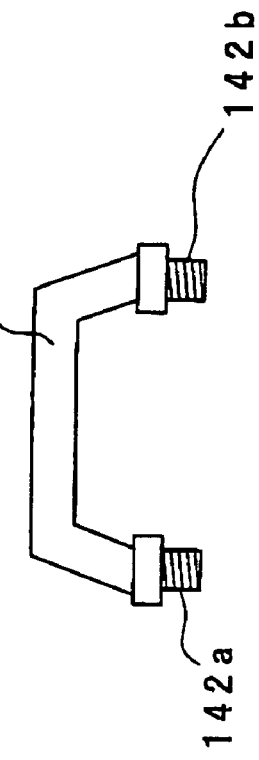
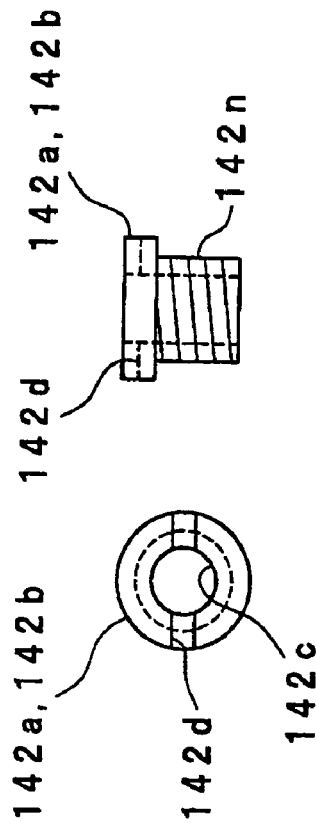
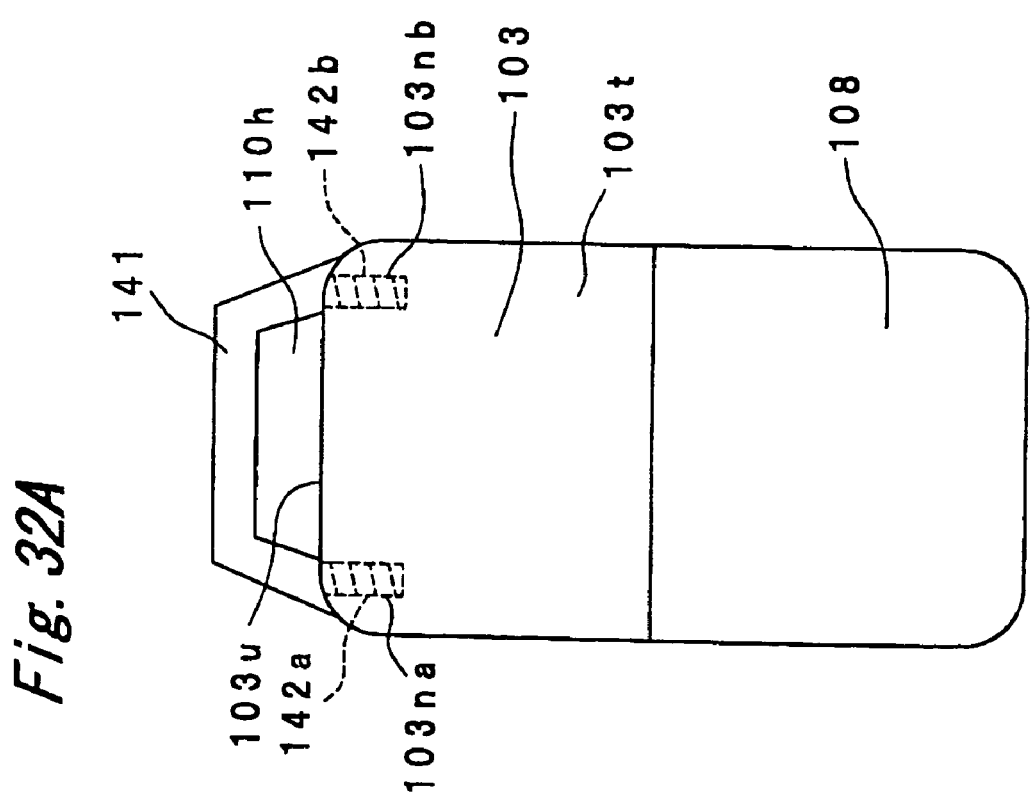
Fig. 32B
Fig. 32C   Fig. 32D
Fig. 32A

PORTABLE RADIO COMMUNICATION APPARATUS PROVIDED WITH BOOM PORTION WITH THROUGH HOLE

BACKGROUND OF THE INVENTION

1. Field of the Invention

The present invention generally relates to a portable radio communication apparatus, and in particular, relates to a portable radio communication apparatus having a feature in a supporting device or a supporting member of communication equipment such as a portable telephone terminal apparatus or the like.

2. Description of the Related Art

Recently, portable radio communication apparatuses such as portable telephone terminal apparatuses or the like have been increasingly made smaller in size and thinner. In addition, the portable radio communication apparatus has been used not only as a conventional telephone but also transformed to a data terminal apparatus for transmitting and receiving E-mails and for viewing web pages through WWW (World Wide Web). Due to this, a display for the portable radio communication apparatus has been made larger in size. In these circumstances, folding-type portable telephone terminals considered to be suited to make the portable radio communication apparatus smaller in size and make the display large in size have been spread.

FIG. 33A is a plan view of a conventional folding-type portable radio communication apparatus 151 in a folding state, and FIG. 33B is a side view thereof.

Referring to FIGS. 33A and 33B, the portable radio communication apparatus 151 is constituted so that an upper housing 152 and a lower housing 103 are connected to be foldable through a hinge portion 104. The upper housing 152 is provided with the following:

(a) a display 105 which displays information such as characters and images as transmitted and received by or stored in the portable radio communication apparatus;

(b) a sound hole portion 106 for speaker which is formed above a speaker and which is provided for outputting speech of the other party during a telephone call from the speaker; and (c) an external antenna 153 such as a whip antenna which is used upon transmitting and receiving a radio wave by the portable radio communication apparatus.

Further, the lower housing 103 is provided with a keyboard 107 for button operation, a rechargeable battery 108, and a microphone 109.

In addition, the Japanese patent laid-open publication No. JP 2002-516503 A discloses an antenna for communication apparatus including an antenna element, and having a first flip provided in a housing to be pivotally supported so as to move from a closed position located to be adjacent to the housing to an operating position apart from the housing with an angular displacement. In the antenna, a second flip including a conductive element which serves as a ground surface is rotatably mounted to the housing, and the second flip moves between a closed position located to be adjacent to the housing and an operating position apart from both the housing and the first flip with angular displacement. When the first and second flips are located at their closed positions, they cover a controller and the antenna is not at all exposed to the outside of the housing. When the first and second flips are located at their operating positions, the antenna element and the conductive element form an antenna apparatus which is less interfered by the user and which is optimally tuned to the frequency of a radio network.

However, since the external antenna 153 shown in FIGS. 33A and 33B protrudes from the upper housing, users sometimes feel uncomfortable due to the following reason. When the user takes out the portable radio communication apparatus from his pocket, it is caught by his pocket. When the user sits on his chair with the portable radio communication apparatus in his trouser pocket, the user is strongly pressed by the external antenna 153. Further, when the portable radio communication apparatus is suspended from his neck without putting it into his pocket, the center of gravity of the portable radio communication apparatus 151 deviates from the center thereof due to its asymmetric structure, as shown in FIG. 34, in which the external antenna 153 is mounted on either the upper right or upper left end portion of the portable radio communication apparatus 151, so that there has been such a problem that the portable radio communication apparatus 151 disadvantageously becomes off balanced.

Moreover, since the portable radio communication apparatus described in the above-mentioned the Japanese patent laid-open publication No. JP 2002-516503 A has such a complicated structure that a housing, a first flip and a second flip are provided, and the first flip including the antenna element is large in size, the portable radio communication apparatus disadvantageously becomes a hindrance to the user and is low in operability.

SUMMARY OF THE INVENTION

It is an object of the present invention to provide a portable radio communication apparatus which can solve the above-mentioned disadvantages, which can be constituted to be bilaterally symmetric so that even if the portable radio communication apparatus is put into his pocket of the user, the user does not feel uncomfortable and so that if the portable radio communication apparatus is suspended from his neck, the potable radio communication apparatus can be suspended in a well-balanced manner while maintaining better antenna radiation pattern, and which can further improve both performance and design.

In order to achieve the above-mentioned objective, according to one aspect of the present invention, there is provided a portable radio communication apparatus including a boom portion having both ends connected with a housing of the portable radio communication apparatus and having a central portion located between the both ends. In the portable radio communication apparatus, at least one through hole is formed between the boom portion and the housing.

In the above-mentioned portable radio communication apparatus, the boom portion preferably includes a central portion and two end portions. The central portion extends in parallel to a width direction of the portable radio communication apparatus, and the two end portions are bent respectively from both ends of the central portion.

In the above-mentioned portable radio communication apparatus, the boom portion preferably has a shape of an arch.

In the above-mentioned portable radio communication apparatus, a thickness of each of both ends of the boom portion is preferably larger than a thickness of the central portion of the boom portion.

In the above-mentioned portable radio communication apparatus, a width of each of both ends of the boom portion is preferably larger than a width of the central portion of the boom portion.

In the above-mentioned portable radio communication apparatus, the boom portion is preferably detachable from the housing.

In the above-mentioned portable radio communication apparatus, the boom portion is preferably provided so as to extend on a plane substantially equal to a plane of a bottom surface of the portable radio communication apparatus.

In the above-mentioned portable radio communication apparatus, the boom portion is preferably provided so as to be inclined so that the central portion of the boom portion protrudes from a plane of a bottom surface of the portable radio communication apparatus.

In the above-mentioned portable radio communication apparatus, the boom portion is preferably made of a dielectric.

In the above-mentioned portable radio communication apparatus, the boom portion is preferably made of a dielectric which is an elastic resin material.

In the above-mentioned portable radio communication apparatus, the boom portion is preferably made of a conductor material.

In the above-mentioned portable radio communication apparatus, at least one part of an antenna element of the portable radio communication apparatus is preferably provided on one of an interior and a surface of the boom portion.

The above-mentioned portable radio communication apparatus preferably further includes a reinforcement member formed between the boom portion and the housing. At least one part of an antenna element of the portable radio communication apparatus is provided on one of an interior and a surface of the reinforcement member.

In the above-mentioned portable radio communication apparatus, at least one part of a parasitic element of the portable radio communication apparatus is preferably provided on one of an interior and a surface of the boom portion.

According to another aspect of the present invention, there is provided a portable radio communication apparatus including a plate-shaped strap attachment portion connected with an end portion of a housing of the portable radio communication apparatus. In the portable radio communication apparatus, at least one through hole is formed in the strap attachment portion. At least one part of an antenna element of the portable radio communication apparatus is provided on one of an interior and a surface of the strap attachment portion.

In the above-mentioned portable radio communication apparatus, at least one part of a parasitic element of the portable radio communication apparatus is provided on one of the interior and the surface of the strap attachment portion.

In the above-mentioned portable radio communication apparatus, a thickness of a connection portion of the strap attachment portion which is connected with the end portion of the housing of the portable radio communication apparatus is preferably larger than a thickness of a portion of the strap attachment portion which is apart from the housing of the portable radio communication apparatus.

In the above-mentioned portable radio communication apparatus, the antenna element preferably includes a helical conductor.

In the above-mentioned portable radio communication apparatus, the antenna element preferably includes a meander conductor.

In the above-mentioned portable radio communication apparatus, the meander conductor is preferably formed so as to be bent three-dimensionally.

According to the portable radio communication apparatus of one aspect of the present invention, a radio wave can be transmitted and received without using any external antenna as used in the prior art. It is therefore possible to solve such a conventional disadvantage that the external antenna is sometimes caught in his pocket when the portable radio communication apparatus is taken out of his pocket. Further, since at least one through hole is formed in the space between the boom portion and the housing, the portable radio communication apparatus can be suspended from his neck with a strap attached to the boom portion. Also in this case, it is unnecessary to use the conventional external antenna. Therefore, the portable radio communication apparatus can be designed to be bilaterally symmetric, and the portable radio communication apparatus can be easily well bilaterally or horizontally balanced when the portable radio communication apparatus is suspended from his neck.

According to the portable radio communication apparatus of another aspect of the present invention, a radio wave can be transmitted and received without using any external antenna as used in the prior art. It is therefore possible to solve such a conventional disadvantage that the external antenna is sometimes caught in his pocket when the portable radio communication apparatus is taken out of his pocket. Further, since at least one through hole is formed in the strap attachment portion, the portable radio communication apparatus can be suspended from his neck with a strap attached to the through hole. Also in this case, it is unnecessary to use the conventional external antenna. Therefore, the portable radio communication apparatus can be designed to be bilaterally symmetric, and the portable radio communication apparatus can be easily well bilaterally or horizontally balanced when the portable radio communication apparatus is suspended from his neck.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 1A and 1B show a configuration example of a folding-type portable radio communication apparatus 101 of a first preferred embodiment according to the present invention, where FIG. 1A is a plan view of the portable radio communication apparatus 101, and FIG. 1B is a side view of the portable radio communication apparatus 101;

FIG. 4A is a plan view showing a configuration example of a lower housing of a portable radio communication apparatus 101a of a first modified preferred embodiment of the first preferred embodiment according to the present invention;

FIG. 4B is a plan view showing a configuration example of a lower housing of a portable radio communication apparatus 101b of a second modified preferred embodiment of the first preferred embodiment according to the present invention;

FIGS. 10A and 10B show a seventh preferred embodiment according to the present invention, where FIG. 10A is a plan view of a portable radio communication apparatus 101h which employs an antenna element 720 including a meander conductor 721 which is three-dimensionally bent with a perspective view showing an example of the portable radio communication apparatus 101h, and FIG. 10B is a side view of the meander conductor 721 and a radiation conductor 702 shown in FIG. 10A;

FIG. 11A is a plan view of the portable radio communication apparatus 801, and FIG. 11B is a side view of the portable radio communication apparatus 801;

FIG. 12A is a plan view of the portable radio communication apparatus 900, and FIG. 12B is a side view of the portable radio communication apparatus 900;

FIG. 13A is a plan view of the radio communication apparatus 900a, and FIG. 13B is a side view of the portable radio communication apparatus 900a;

FIGS. 14A and 14B show a configuration example of a straight-type portable radio communication apparatus 801a of a tenth preferred embodiment according to the present invention, where FIG. 14A is a plan view of the portable radio communication apparatus 801a, and FIG. 14B is a side view of the portable radio communication apparatus 801a;

FIGS. 17A and 17B show a configuration example of a folding-type portable radio communication apparatus 101k of a thirteenth preferred embodiment according to the present invention, where FIG. 17A is a plan view of the portable radio communication apparatus 101k, and FIG. 17B is a side view of the portable radio communication apparatus 101k;

FIG. 18 is a side view showing an example of a case where the portable radio communication apparatus 101k shown in FIGS. 17A and 17B is put on a flat surface 1300;

FIGS. 19A and 19B show a configuration example of a folding-type portable radio communication apparatus 101l of a fourteenth preferred embodiment according to the present invention, where FIG. 19A is a plan view of the portable radio communication apparatus 101l, and FIG. 19B is a side view of the portable radio communication apparatus 101l;

FIGS. 21A and 21B show a configuration example of a folding-type portable radio communication apparatus 101m of a fifteenth preferred embodiment according to the present invention, where FIG. 21A is a plan view of the portable radio communication apparatus 101m, and FIG. 21B is a side view of the portable radio communication apparatus 101m;

FIGS. 22A and 22B show a configuration example of a folding-type portable radio communication apparatus 101n of a sixteenth preferred embodiment according to the present invention, where FIG. 22A is a plan view of the portable radio communication apparatus 101n, and FIG. 22B is a side view of the portable radio communication apparatus 101n;

FIGS. 24A and 24B show a configuration example of a folding-type portable radio communication apparatus 101o of a seventeenth preferred embodiment according to the present invention, where FIG. 24A is a plan view of the portable radio communication apparatus 101o and FIG. 24B is a side view of the portable radio communication apparatus 101o;

FIGS. 25A and 25B show a configuration example of a folding-type portable radio communication apparatus 101p of an eighteenth preferred embodiment according to the present invention, where FIG. 25A is a plan view of the portable radio communication apparatus 101p, and FIG. 25B is a side view of the portable radio communication apparatus 101p;

FIG. 27A is a plan view of the portable radio communication apparatus 101q, and FIG. 27B is a side view of the portable radio communication apparatus 101q;

FIGS. 28A and 28B show a configuration example of a folding-type portable radio communication apparatus 101r of a twentieth preferred embodiment according to the present invention, where FIG. 28A is a plan view of the portable radio communication apparatus 101r, and FIG. 28B is a side view of the portable radio communication apparatus 101r;

FIGS. 29A and 29B show a configuration example of a folding-type portable radio communication apparatus 101s of a twenty-first preferred embodiment according to the present invention, where FIG. 29A is a plan view of the portable radio communication apparatus 101s, and FIG. 29B is a side view of the portable radio communication apparatus 101s;

FIG. 30A is a plan view of the portable radio communication apparatus 101s, and FIG. 30B is a side view of the portable radio communication apparatus 101s;

FIGS. 31A and 31B show a configuration example of a folding-type portable radio communication apparatus 101t of a twenty-second preferred embodiment according to the present invention, where FIG. 31A is a plan view of the portable radio communication apparatus 101t, and FIG. 31B is a side view of the portable radio communication apparatus 101t;

FIGS. 32A, 32B, 32C and 32D show a detailed configuration of the portable radio communication apparatus 101t shown in FIGS. 31A and 31B, where FIG. 32A shows an example of a lower housing of the portable radio communication apparatus 101t, FIG. 32B shows the specific example of a boom portion of the portable radio communication apparatus 101t, FIG. 32C is a top view showing a specific example of screw portions 142a and 142b of the portable radio communication apparatus 101t, and FIG. 32D is a side view showing a specific example of the screw portions 142a and 142b of the portable radio communication apparatus 101t;

FIG. 33A is a plan view of the portable radio communication apparatus 151, and FIG. 33B is a side view of the portable radio communication apparatus 151.

DETAILED DESCRIPTION OF THE PREFERRED EMBODIMENTS

Figure 2:
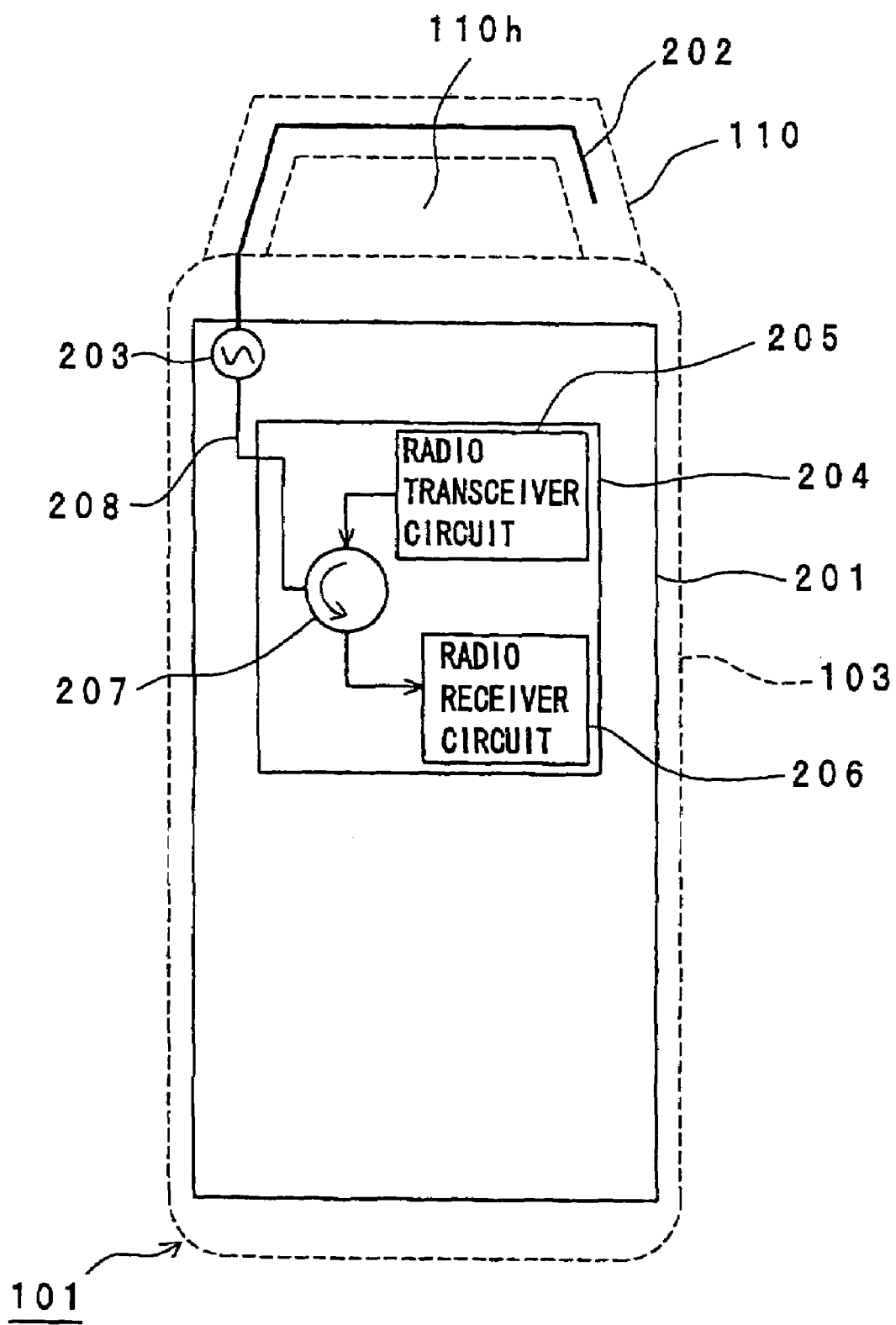
FIG. 2 is a plan view of the portable radio communication apparatus 101 shown in FIG. 1A with a perspective view showing an example of a lower housing 103 of the portable radio communication apparatus 101.

Various preferred embodiments according to the present invention will be described hereinafter with reference to the drawings. In the drawings, similar components are denoted by the same reference numerals, respectively.

First Preferred Embodiment

FIG. 1A is a plan view of a portable radio communication apparatus 101 of a first preferred embodiment according to the present invention in a folding state, and FIG. 1B is a side view thereof. FIG. 2 is a plan view of the portable radio communication apparatus 101 shown in FIG. 1A with a perspective view showing a part of a lower housing 103 thereof.

Referring to FIGS. 1A and 1B, the portable radio communication apparatus 101 is constituted by including the following:

(a) an approximately rectangular parallelepiped upper housing 102;
(b) an approximately rectangular parallelepiped lower housing 103;
(c) a hinge portion 104 which connects the upper housing 102 with the lower housing 103;
(d) a display 105 and a sound hole portion 106 for a speaker provided in the upper housing 102; and
(e) a keyboard 107;
(f) a rechargeable battery 108; and
(g) a microphone 109 and a boom portion 110 which are provided within the lower housing 103.

Referring to FIGS. 1A and 1B, by connecting the upper housing 102 with the lower housing 103 through the hinge portion 104, the portable radio communication apparatus 101 is foldable by the hinge portion 104. The display 105, which displays information such as characters and images which are transmitted from and received by or stored in the portable radio communication apparatus 101, is provided on an inner surface 102s of the upper housing 102 which is located inside when the portable radio communication apparatus 101 is folded. In addition, a speaker (not shown) connected with a radio receiver circuit 206 (See FIG. 2) of the portable radio communication apparatus 101 and the sound hole portion 106 for speaker which is located on the speaker and outputs speech of the other party during a telephone call from the speaker are provided on the inner surface 102s of the upper housing 102 on which the display 105 is provided on the opposite side of the hinge portion 104 across the display 105. Further, the keyboard 107 for button input operation is provided on an inner surface 103s of the lower housing 103 which is located inside when the portable radio communication apparatus 101 is folded. The microphone 109 is provided on the inner surface 103s of the lower housing 103 on which the keyboard 107 is provided on the opposite side of the hinge portion 104 across the keyboard 107. The rechargeable battery 108 is provided on an outer surface 103t (hereinafter, referred to as a bottom surface) of the lower housing 103 on the opposite side of the keyboard 107.

The boom portion 110 is made of a circular cylindrical dielectric member having a larger length than the width of the portable radio communication apparatus 101, and both ends of the boom portion 110 are each bent so as to be symmetric with respect to a plane passing through the central portion in the longitudinal direction of the boom portion 110. The both ends of the boom portion 110 are coupled with a top surface 103u of the lower housing 103. In this case, the top surface 103u is a surface which couples the inner surface 103s, on which the keyboard 107 of the lower housing 103 is provided, with the opposite bottom surface 103t which is opposed to the inner surface 103s, and the top surface 103u is located so as to be adjacent to the hinge portion 104. At that time, the boom portion 110 is mounted so that the housing of the portable radio communication apparatus 101 including the boom portion 110 is bilaterally symmetric with respect to a central plane in the width direction of the portable radio communication apparatus 110 as shown in FIG. 1A, and so that the boom portion 110 does not protrude outward from the bottom surface 103t of the lower housing 103 (rightward of the housing of FIG. 1B) as shown in FIG. 1B.

Referring to FIG. 1B, the longitudinal direction of the central portion of the boom portion 110 is parallel to the bottom surface 103t of the lower housing 103 when seen from the side surface of the portable radio communication apparatus 101 (from the upper side of the paper of FIG. 1B), the boom portion 110 is provided so as to be coupled with the bottom surface 103t of the lower housing 103 with no step (or no difference in height) and to extend on substantially the same plane as that of the bottom surface 103t. In the present preferred embodiment, it is important that an approximately trapezoidal through hole 110h is formed within a space surrounded by the boom portion 110 and the lower housing 103. In FIGS. 1A and 1B, it is noted that there is shown such a configuration example as the portable radio communication apparatus 101 which does not include other protrusions such as an external antenna or the like and which includes therein an antenna is shown.

Referring to FIG. 2, a lower substrate 201 is provided on the inside of the lower housing 103. Further, an antenna element 202 is provided so as to extend into the boom portion 110 and the lower housing 103 and to include a monopole strip conductor having a length of λ/4, where λ is the wavelength of each of the transmitted and received radio signals. The antenna element 202 is connected with a radio communication circuit 204 provided on the lower substrate 201 through a feeding point 203 provided within the lower housing 103. For details, the radio communication circuit 204 is constituted by including a radio transceiver circuit 205, a radio receiver circuit 206 and a circulator 207. The feeding point 203 is connected with the circulator 207 through a feeding cable 208. At this time, the input impedance of the antenna element 202, the characteristic impedance of the feeding cable 208 and the output impedance of the radio communication circuit 204 are set to a predetermined impedance of, for example, 50Ω. The radio transceiver circuit 205 and the radio receiver circuit 206 are connected with the circulator 207.

When the portable radio communication apparatus 101 transmits a radio wave including an information signal such as speech, data or image, the radio transceiver circuit 205 modulates a carrier wave according to the information signal by a predetermined digital modulation method, and then, transforms the frequency of the carrier wave to a radio signal having a higher frequency and amplifies the power of the carrier wave, so that a transmitted radio signal is generated. The transmitted radio signal is inputted into the antenna element 202 through the circulator 207, the feeding cable 208 and the feeding point 203, and then, is radiated into the space from the antenna element 202. On the other hand, when the portable radio communication apparatus 101 receives a radio signal modulated according to the information signal such as a speech, data or image as a received radio signal, the received radio signal received by the antenna 202 is inputted into the radio receiver circuit 206 through the feeding point 203, the feeding cable 208 and the circulator 207. The radio receiver circuit 206 amplifies the inputted radio signal by a low noise amplifier, transforms the frequency of the radio signal to a lower frequency thereof, and demodulates the radio signal by a predetermined digital demodulation method, so that an information signal is regenerated and outputted.

Figure 33A:
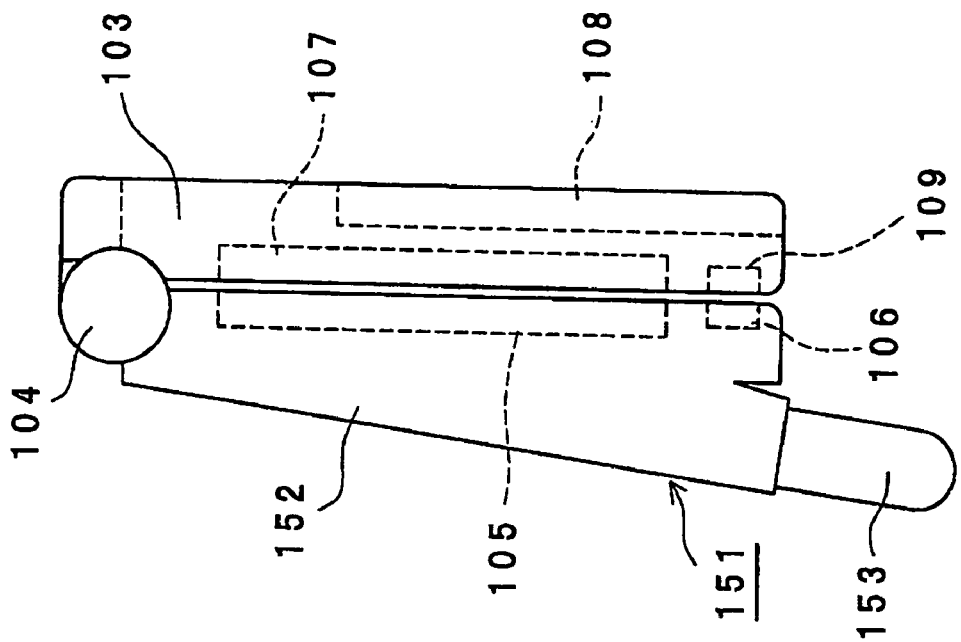
FIGS. 33A and 33B show an example of a conventional folding-type portable radio communication apparatus 151, where
Figure 33B:
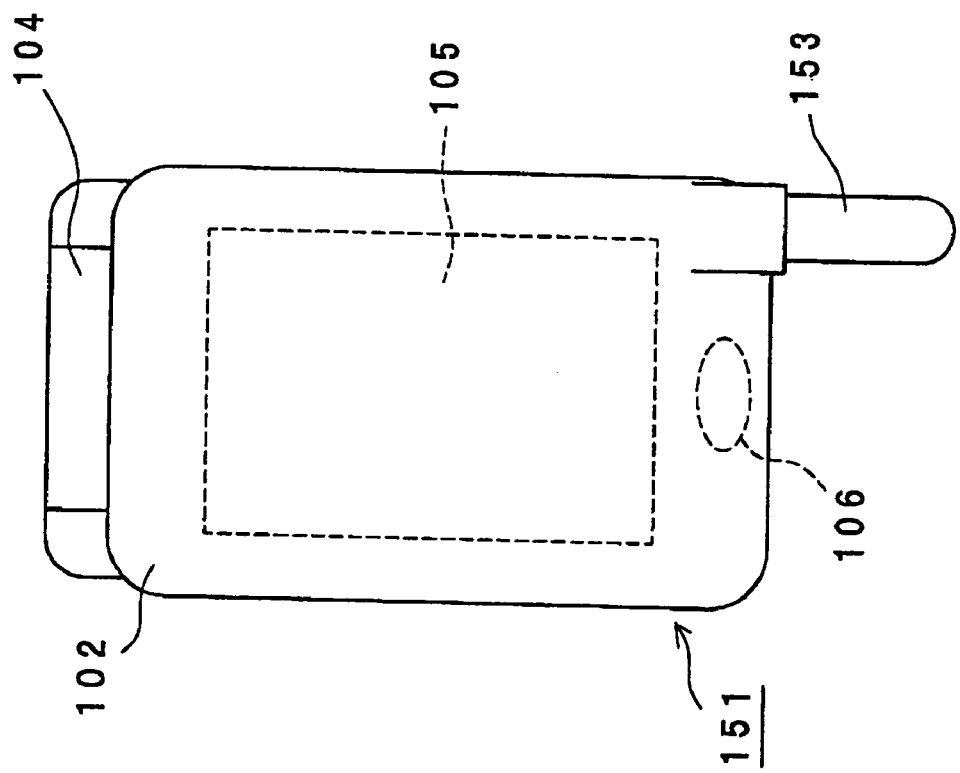
Figure 34:
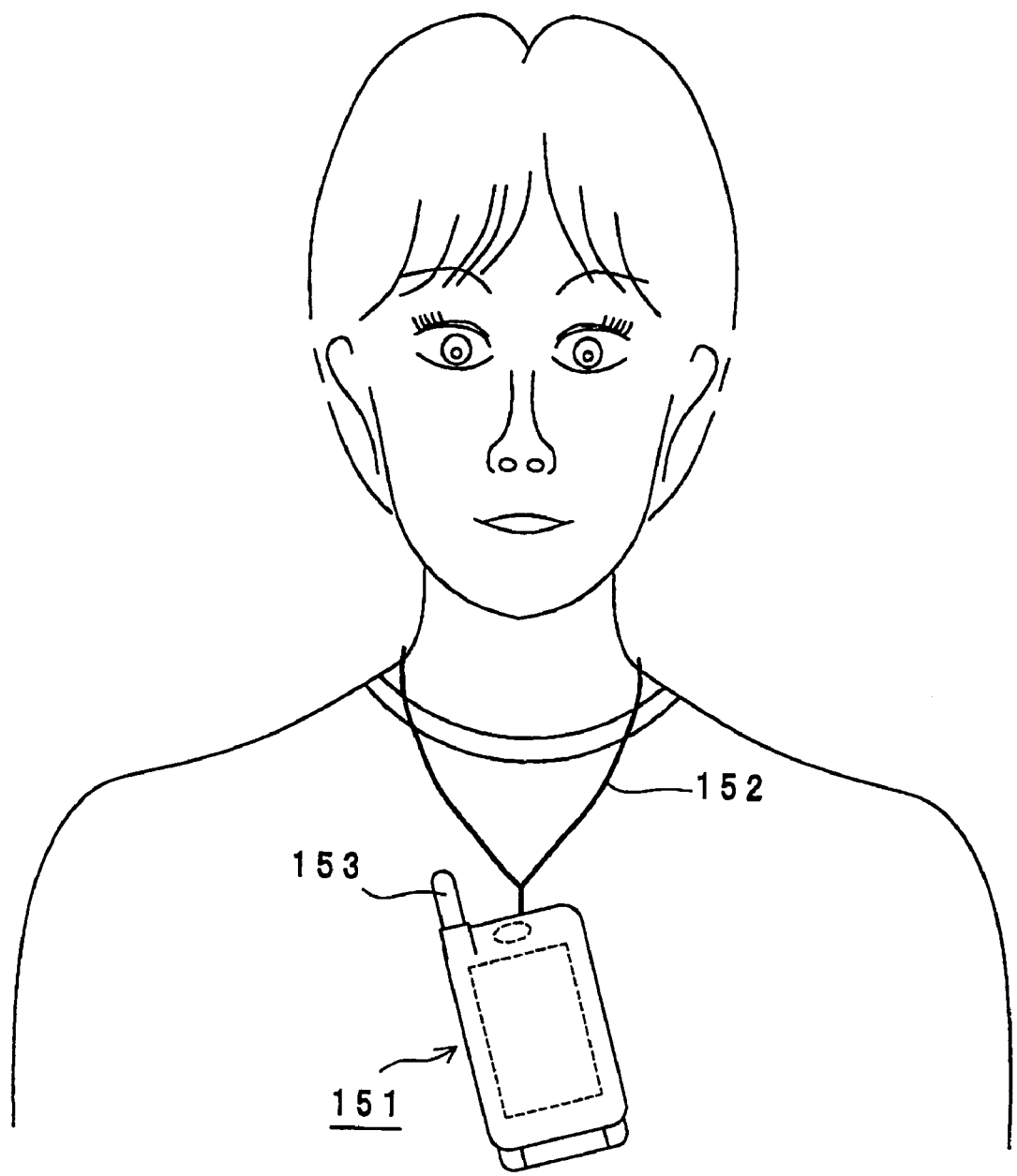
FIG. 34 is a front view showing one example of a case where the conventional portable radio communication apparatus 151 is used when it is suspended from his neck.

By thus forming the antenna element 202 on the inside of the boom portion 110, a radio wave can be transmitted and received without the external antenna 153 as used in the prior art (FIG. 33). Therefore, the portable radio communication apparatus 101 according to the present preferred embodiment can solve the disadvantages of the conventional portable radio communication apparatus having the case where the external antenna is caught in his pocket when taking out the portable radio communication apparatus from his pocket.

Figure 3:
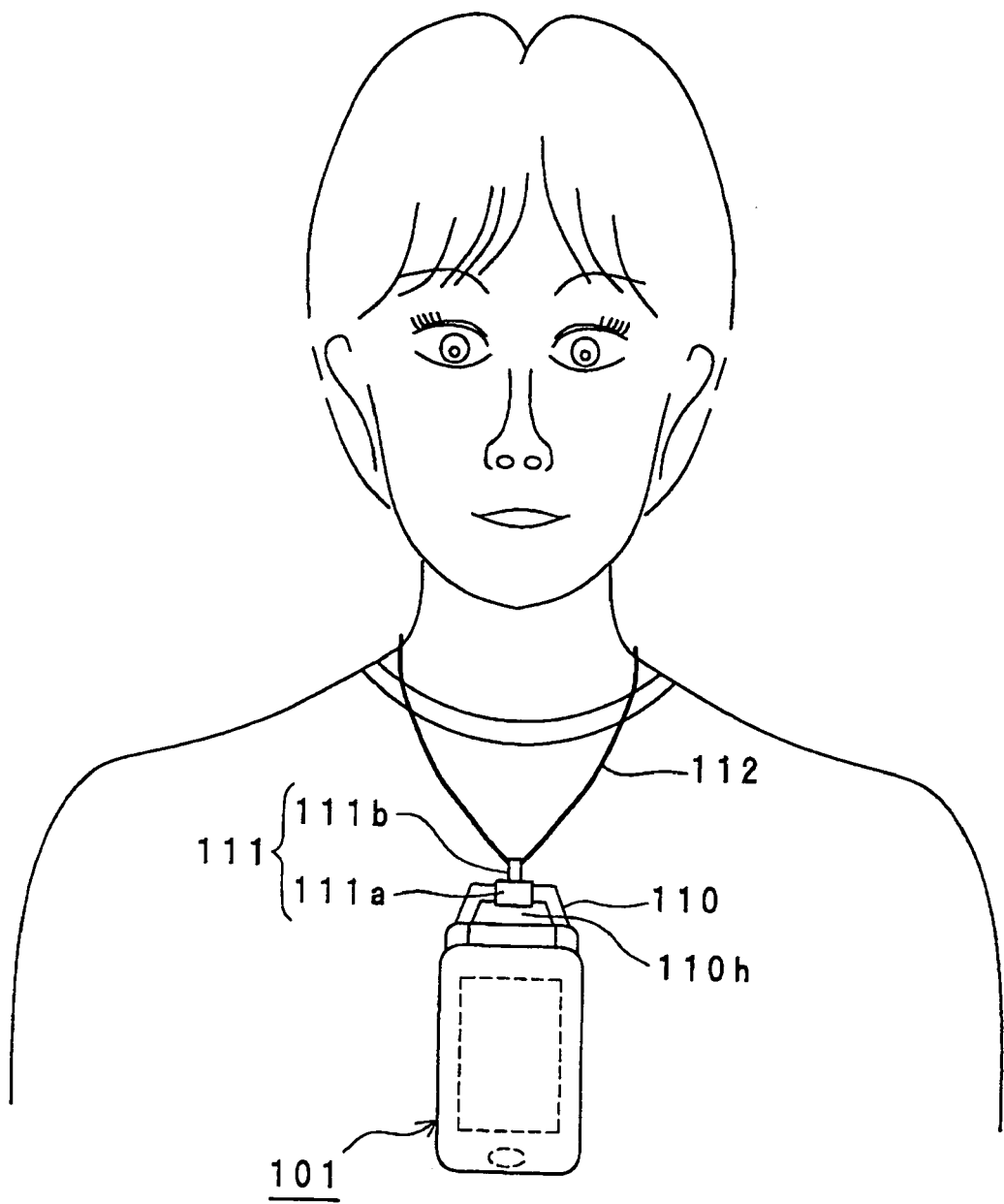
FIG. 3 is a front view showing an example of using the portable radio communication apparatus 101 shown in FIGS. 1A and 1B when it is suspended from his neck.

FIG. 3 is a front view showing one example of a case where the portable radio communication apparatus 101 shown in FIGS. 1A and 1B is used with the portable radio communication apparatus 101 suspended from his neck. In the example of FIG. 3, a strap attachment member 111 or so-called connector is constituted by including an attachment portion 111a and a strap insertion portion 111b, and the strap attachment member 111 is employed to attach a strap 112 to the portable radio communication apparatus 101. For details, the attachment portion 111a of the strap attachment member 111 is mounted to closely contact and coupled with the outer peripheral surface of the central portion in the longitudinal direction of the boom portion 110 of the portable radio communication apparatus 101, and the strap 112 is inserted into the strap insertion portion 111b of the strap attachment member 111. In this case, the strap insertion portion 111b has a through hole of, for example, circular shape for inserting the strap thereinto.

Further, an approximately trapezoidal through hole 110h is formed within a space surrounded by the boom portion 110 and the lower housing 103 of the portable radio communication apparatus 101 of the present preferred embodiment. Therefore, as shown in FIG. 3, the portable radio communication apparatus 101 can be suspended from his neck with the strap 112 attached to the boom portion 110. Also in this case, since it is not necessary to use external antenna 153 of FIG. 33, which is used in the prior art apparatus, the portable radio communication apparatus 101 can be designed to be bilaterally symmetric. Therefore, the portable radio communication apparatus 101 can be well balanced bilaterally when the portable radio communication apparatus 101 is suspended from his neck.

Furthermore, according to the portable radio communication apparatus 101 of the present preferred embodiment, when communication is held using the portable radio communication apparatus 101, the user can put the user's finger onto the boom portion 110, so that the operability of the portable radio communication apparatus 101 can be improved.

FIG. 4A is a plan view showing a configuration example of a lower housing 103 of a portable radio communication apparatus 101a of a first modified preferred embodiment of the first preferred embodiment according to the present invention. The boom portion 110 is formed by bending the circular cylindrical dielectric member in the example of FIGS. 1A and 1B, whereas the portable radio communication apparatus 101a of the modified preferred embodiment shown in FIG. 4A is characterized by forming rectangular through holes 113 and 114 for passing a strap through an isosceles trapezoidal strap attachment portion 110a made of a parallel plate-shaped dielectric. The trapezoidal plate-shaped strap attachment portion 110a is provided, in a manner similar to that of the boom portion 110 shown in FIGS. 1A and 1B, so that one of the parallel sides of a trapezoid is coupled with the top surface 103u of a lower housing (corresponding to the lower housing 103 of FIGS. 1A and 1B) of the portable radio communication apparatus 101a. In addition, the two through holes 113 and 114 are formed in the central portion of the strap attachment portion 110a at positions symmetric with respect to a plane which passes through the central portion in the widthwise direction of the portable radio communication apparatus 101a. In a manner similar to that of FIG. 2, an antenna element 202 is buried or embedded in the strap attachment portion 110a. Further, by forming the two through holes 113 and 114 in the strap attachment portion 110a as openings for attaching the strap, it is possible to directly attach the strap to the portable radio communication apparatus 101a without using any special attachment member.

FIG. 4B is a plan view showing a configuration example of a lower housing 103 of a portable radio communication apparatus 101b of a second modified preferred embodiment of the first preferred embodiment according to the present invention. In the modified preferred embodiment of FIG. 4B, the portable radio communication apparatus 101b is characterized by forming two through holes 113 and 114 in a strap attachment portion 110b made of a rectangular parallel plate-shaped dielectric. The strap attachment portion 110b is constituted in a manner similar to that of the strap attachment portion 110a shown in FIG. 4A except that the portion 110b is rectangular.

Second Preferred Embodiment

The first preferred embodiment has been described with reference to an example of forming the antenna element 202 which is a monopole antenna made of a strip conductor of the boom portion 110. Alternatively, the other antenna configurations may be used. As examples of the other configurations, portable radio communication apparatuses 101c, 101d, 101e, 101f, 101g and 101h of second to seventh preferred embodiments according to the present invention will be described with reference to FIGS. 5, 6, 7, 8, 9 and 10A and 10B.

Figure 5:
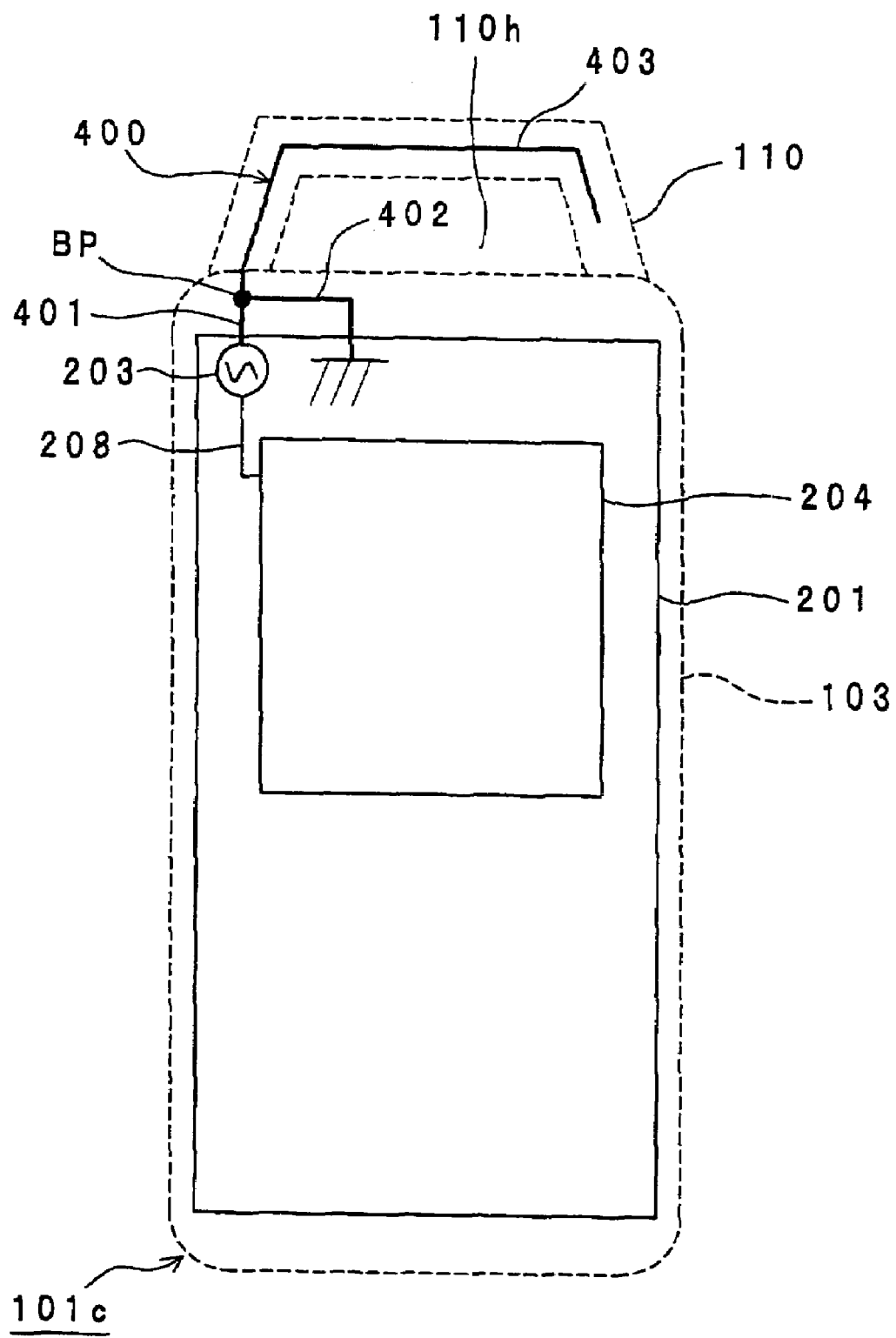
FIG. 5 is a plan view of a portable radio communication apparatus 101c which employs an inverted-F antenna element 400 with a perspective view showing an example of the portable radio communication apparatus 101c of a second preferred embodiment according to the present invention.

FIG. 5 is a plan view of the portable radio communication apparatus 101c which employs an inverted-F antenna element 400, with a perspective view showing a specific configuration example of the portable radio communication apparatus 101c of a second preferred embodiment according to the present invention.

Referring to FIG. 5, the inverted-F antenna element 400 is constituted by including a first antenna portion 401, a second antenna portion 402 and a third antenna portion 403 each of which is formed of a strip conductor. For the details, one end of the first antenna portion 401 of the inverted-F antenna element 400 is connected with a feeding point 203, and another end thereof is connected with a branching point BP. One end of the second antenna portion 402 is connected with the branching point BP, and another end thereof is electrically connected with a ground conductor formed on the lower substrate 201 of the lower housing 103 so as to be grounded. One end of the third antenna portion 403 is connected with the branching point BP, and the third antenna portion 403 is extended from an end portion on one side of the boom portion 110 at the branching point BP to an opposite end portion through the interior of the boom portion 110. In this case, the sum of lengths of the first antenna portion 401 and the third antenna portion 403 is set to a quarter of the wavelength of each of the transmitted and received radio signals, and a combination of the first and third antenna portions 401 and 403 operates as a monopole antenna having a quarter of the wavelength. In addition, the sum of lengths of the second antenna portion 402 and the third antenna portion 403 is set to a quarter of the wavelength of each of the transmitted and received radio signals, and a combination of the second and third antenna portions 402 and 403 operates as a monopole parasitic element having a quarter of the wavelength.

The feeding point 203 is connected with the radio communication circuit 204 on the lower substrate 201 through the feeding cable 208. At this time, the input impedance of the antenna element 202 at the feeding point 203, the characteristic impedance of the feeding cable 203 and the output impedance of the radio communication circuit 204 are set to be substantially equal to an impedance of, for example, 50Ω.

The antenna apparatus including the thus constituted three antenna portions 401, 402 and 403 constitutes the inverted-F antenna element 400. The portable radio communication apparatus 101c of the present preferred embodiment exhibits actions and advantageous effects similar to those of the portable radio communication apparatus 100 shown in FIGS. 1A and 1B except that the inverted-F antenna element 400 is formed in the boom portion 110.

Third Preferred Embodiment

Figure 6:
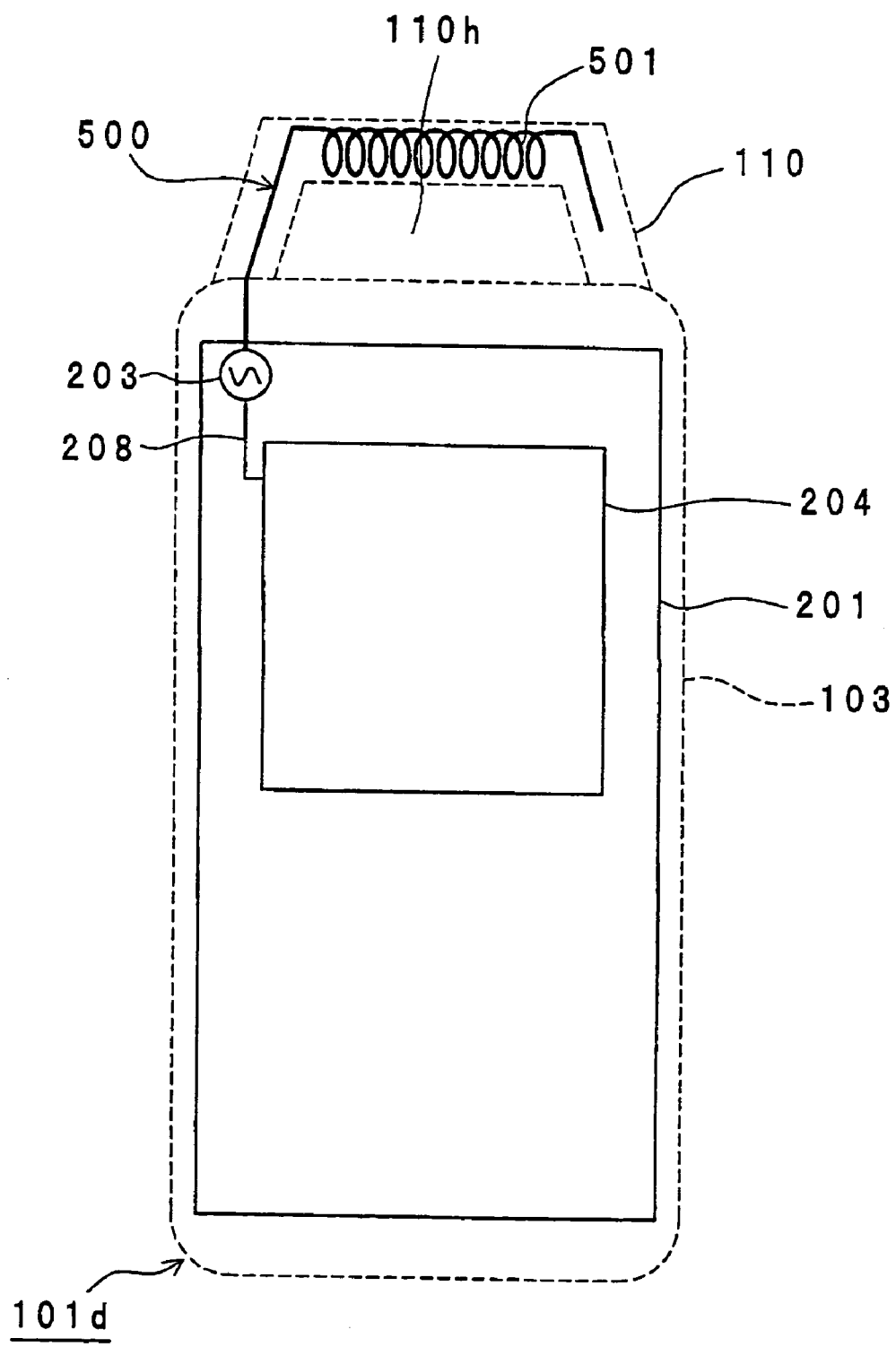
FIG. 6 is a plan view of a portable radio communication apparatus 101d which employs a helical antenna element 501 with a perspective view showing an example of the portable radio communication apparatus 101d of a third preferred embodiment according to the present invention.

FIG. 6 is a plan view of the portable radio communication apparatus 101d which employs a helical antenna element 500 with a perspective view showing an example of the portable radio communication apparatus 101d of the third preferred embodiment according to the present invention. The helical antenna element 500 is formed on the interior of the boom portion 110 and an interior of the lower housing 103 by using, for example, a strip conductor, and characterized by including a helical conductor 501 of helical shape on a part of the middle of the strip conductor. One end of the helical antenna element 500 is connected with the radio communication circuit 204 through the feeding point 203 and the feeding cable 208. The portable radio communication apparatus 101d of the present preferred embodiment exhibits actions and advantageous effects similar to those of the portable radio communication apparatus 100 shown in FIGS. 1A and 1B except that the helical antenna element 500 is formed in the boom portion 110. The helical antenna element 500 has such a unique advantageous effect that the antenna element 500 can transmit and receive a radio signal of a circularly polarized wave with a predetermined diversity pattern.

Fourth Preferred Embodiment

Figure 7:
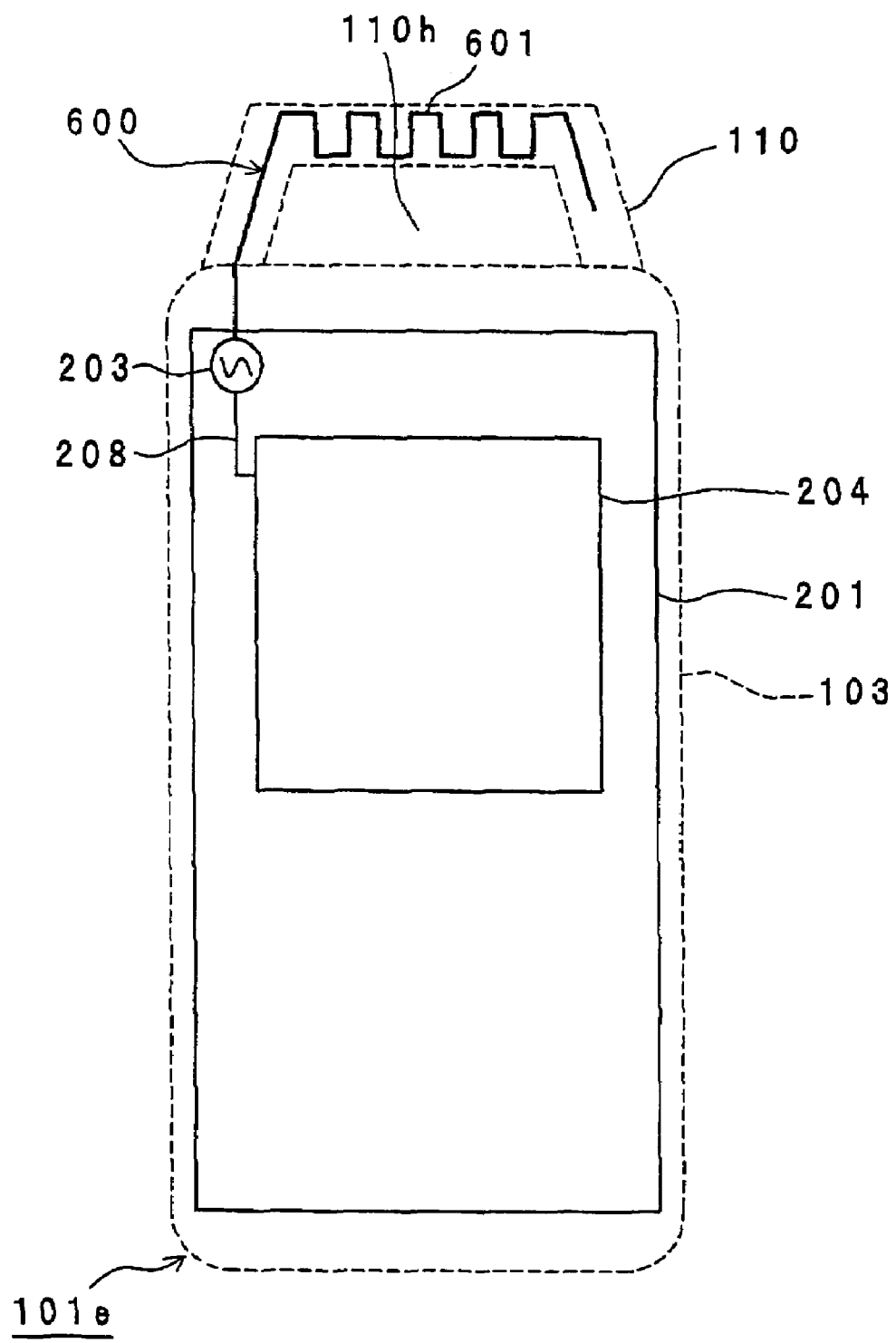
FIG. 7 is a plan view of a portable radio communication apparatus 101e which employs a meander antenna element 600 with a perspective view showing an example of the portable radio communication apparatus 101e of a fourth preferred embodiment according to the present invention.

FIG. 7 is a plan view of the portable radio communication apparatus 101e which employs a meander antenna element 600 with a perspective view showing an example of the portable radio communication apparatus 101e of the fourth preferred embodiment according to the present invention. The meander antenna element 600 is formed on the interior of the boom portion 110 and the interior of the lower housing 103 by using, for example, a strip conductor, and characterized by including a meander conductor 601 of meander shape in the boom portion 110. One end of the meander antenna element 600 is connected with the radio communication circuit 204 through the feeding point 203 and the feeding cable 208.

The portable radio communication apparatus 101e of the present preferred embodiment exhibits actions and advantageous effects similar to those of the portable radio communication apparatus 100 shown in FIGS. 1A and 1B except that the meander antenna element 600 is formed in the boom portion 110. Since the meander antenna element 600 of the present preferred embodiment includes the meander conductor 601, the bandwidth of each of the transmitted and received radio signals is narrower and antenna gain is lower than those of the first preferred embodiment shown in FIGS. 1A and 1B.

Fifth Preferred Embodiment

Figure 8:
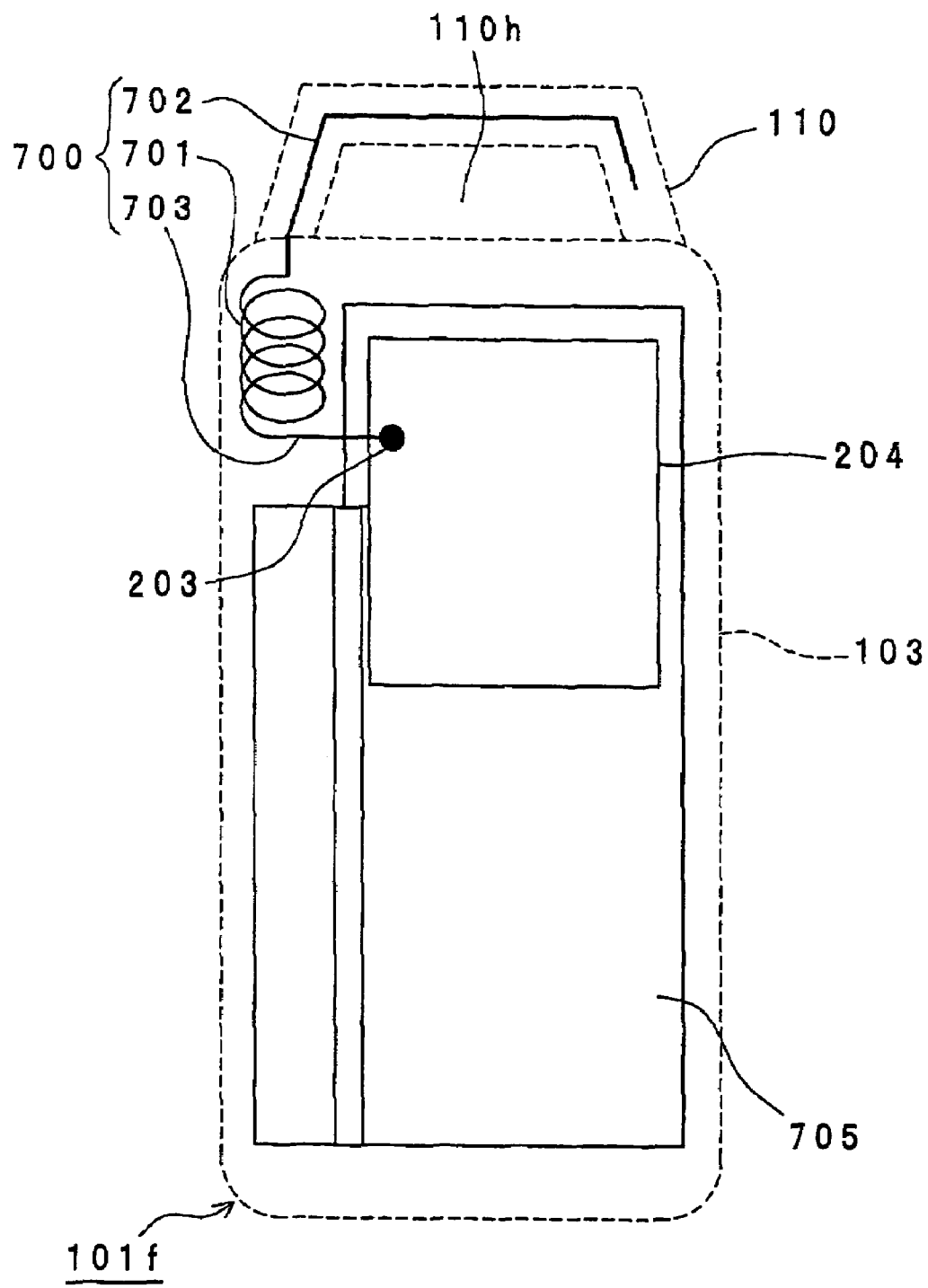
FIG. 8 is a plan view of a portable radio communication apparatus 101f which employs an antenna element 700 including a helical conductor 701 with a perspective view showing an example of the portable radio communication apparatus 101f of a fifth preferred embodiment according to the present invention.

FIG. 8 is a plan view of the portable radio communication apparatus 101f which employs an antenna element 700 including a helical conductor 701 with a perspective view showing an example of the portable radio communication apparatus 101f of the fifth preferred embodiment according to the present invention. As shown in FIG. 8, the antenna element 700 of the portable radio communication apparatus 101f of the present preferred embodiment is formed by using a strip conductor, and is constituted by including a helical conductor 701 of helical shape for shortening an antenna length, a radiation conductor 702 of a linear conductor bent at three portions, and a feeding conductor 703. The helical conductor 701 and the feeding conductor 703 are provided in the lower housing 103 of the portable radio communication apparatus 101f, whereas the radiation conductor 702 is formed in the boom portion 110. One end of the helical conductor 701 of the antenna element 700 is connected with one end of the radiation conductor 702, and another end of the helical conductor 701 forms an open end in the boom portion 110. Another end of the helical conductor 701 is connected with the radio communication circuit 204 through the feeding conductor 703 and the feeding point 203.

In the present preferred embodiment, the strip conductor of the antenna element 700 has an electric length of about $\lambda/4$, where λ is the wavelength of each of the transmitted and received radio signals. A current becomes the largest at the feeding point 203 of the feeding conductor 703, and an electric field is the largest at the open end of the radiation conductor 702. In the present preferred embodiment, therefore, the helical conductor 701 is provided in the vicinity of the feeding point 203 of the antenna element 700 and within the lower housing 103, so that the path length of the flowing current is lengthened by the helical conductor 701, and this leads to that the whole of the antenna element 700 can be made smaller. In addition, an electric field radiated from the radiation conductor 702 is stronger than those of the other portions when the antenna element 700 is excited. Therefore, electromagnetic coupling among the radiation conductor 702, the ground conductor of the lower substrate 705, and a hinge portion (e.g., the hinge portion 104 shown in FIGS. 1A and 1B and made of a conductor) is enhanced, so that an image (mirror image) current flows into the ground conductor and the hinge portion (ground conductor) of the lower substrate 705. As a result, there may be such a potential possibility that it is difficult to radiate a radio wave from the antenna element 700. In this case, when a space (a through hole 110h shown in FIG. 8) between the radiation conductor 702 and the lower housing 103 is filled with a dielectric, the electromagnetic coupling is further enhanced, so that it makes more it difficult to radiate a radio wave. In the present preferred embodiment, the through hole 110h of a space is provided between the radiation conductor 702 and the lower housing 103, so that, as compared with the case where the through hole is filled with the dielectric, it is possible to suppress the above-mentioned electromagnetic coupling. Therefore, it is possible to decrease the protrusion amount of the boom portion 110 from the top surface 103u of the lower housing 103, and improve the sense of beauty thereof.

The portable radio communication apparatus 101f constituted as described above is provided with the antenna element 700 which includes the helical conductor 701 in the vicinity of the feeding point 203, so that the substantial antenna length of the antenna element 700 can be remarkably reduced.

Sixth Preferred Embodiment

Figure 9:
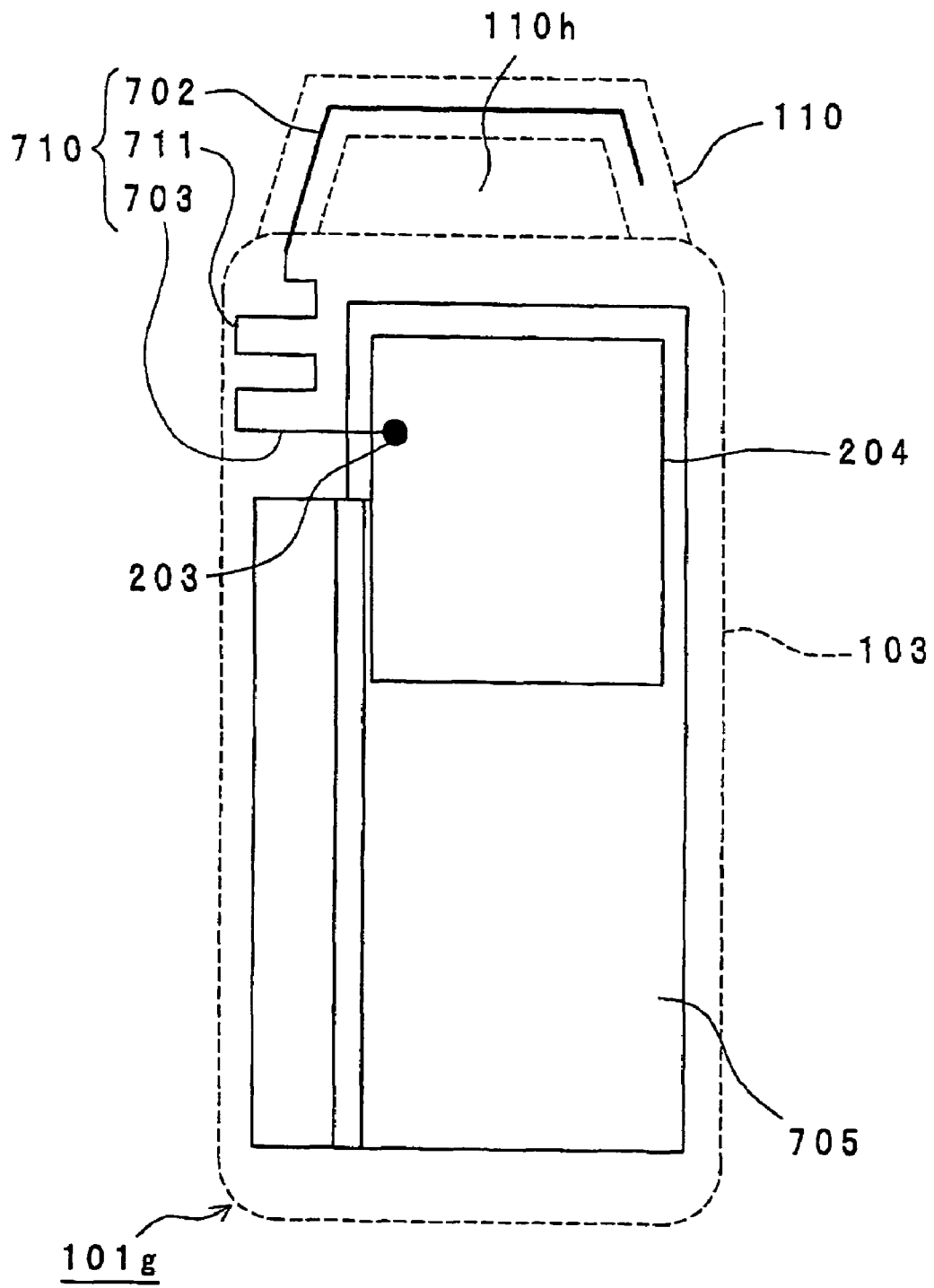
FIG. 9 is a plan view of a portable radio communication apparatus 101g which employs an antenna element 710 including a meander conductor 711 with a perspective view showing an example of the portable radio communication apparatus 101g of a sixth preferred embodiment according to the present invention.

FIG. 9 is a plan view of the portable radio communication apparatus 101g which employs an antenna element 710 including a meander conductor 711 with a perspective view showing an example of the portable radio communication apparatus 101g of the sixth preferred embodiment according to the present invention. The antenna element 710 of the present preferred embodiment is characterized by including a meander conductor 711, a radiation conductor 702 and a feeding conductor 703, and by including the meander conductor 711 of meander shape instead of the helical conductor 701 shown in FIG. 8. The actions and advantageous effects of the present preferred embodiment are similar to those of the fifth preferred embodiment.

Seventh Preferred Embodiment

Figure 10B:
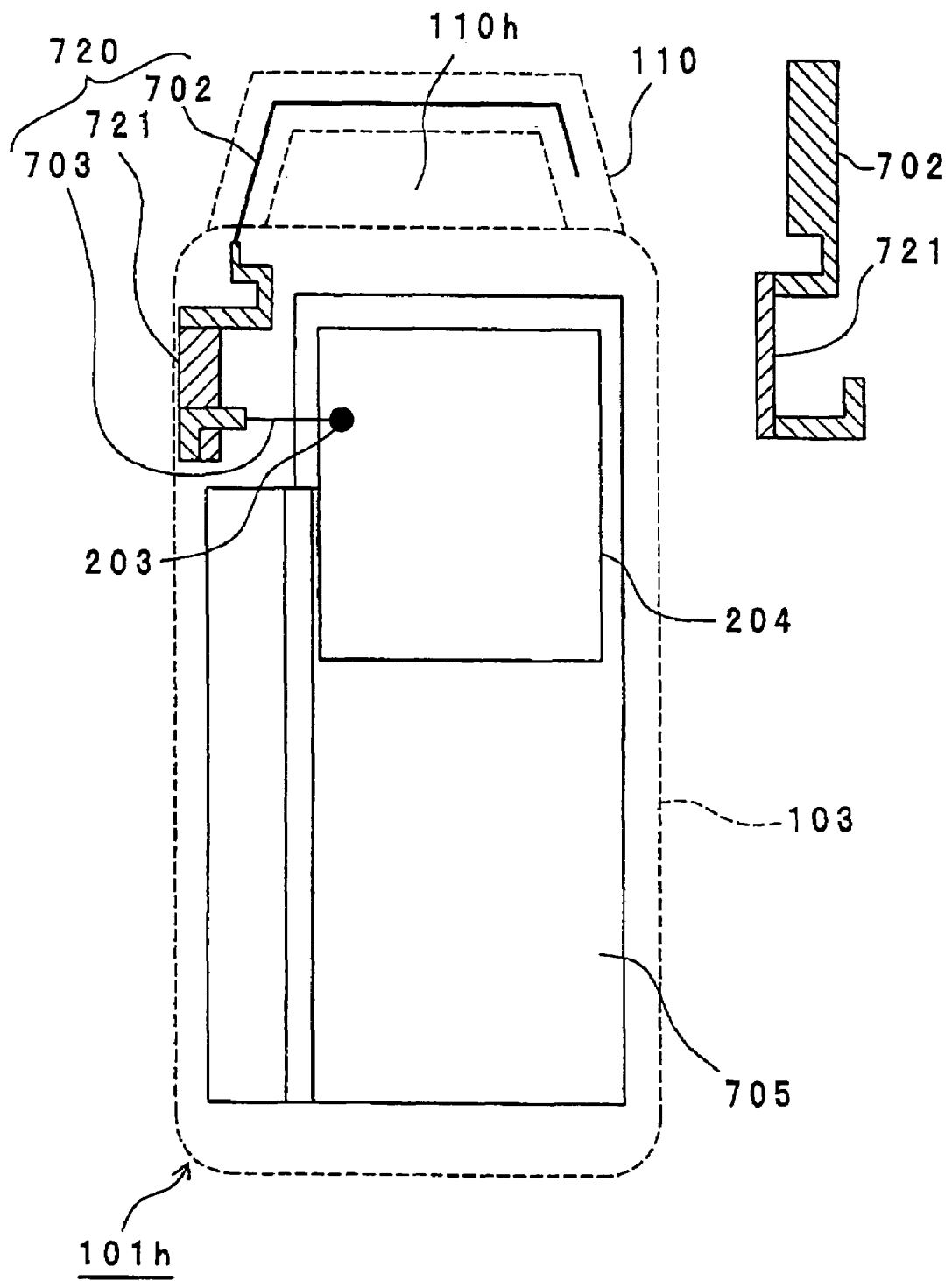

FIGS. 10A and 10B show a seventh preferred embodiment according to the present invention. FIG. 10A is a plan view of a portable radio communication apparatus 101h which employs an antenna element 720 including a meander conductor 721 which is three-dimensionally bent with a perspective view showing an example of the portable radio communication apparatus 101h, and FIG. 10B is a side view of the meander conductor 721 and a radiation conductor 702 shown in FIG. 10A. The antenna element 720 of the present preferred embodiment is characterized by including the meander conductor 721, a radiation conductor 702 and a feeding conductor 703, and by including the meander conductor 721 of meander shape instead of the helical conductor 701 shown in FIG. 8. The actions and advantageous effects of the present preferred embodiment are similar to those of the fifth preferred embodiment. In particular, the present preferred embodiment is characterized in that the meander conductor 721 is formed to be bent in a three-dimensional direction.

Eighth Preferred Embodiment

Figure 11B:
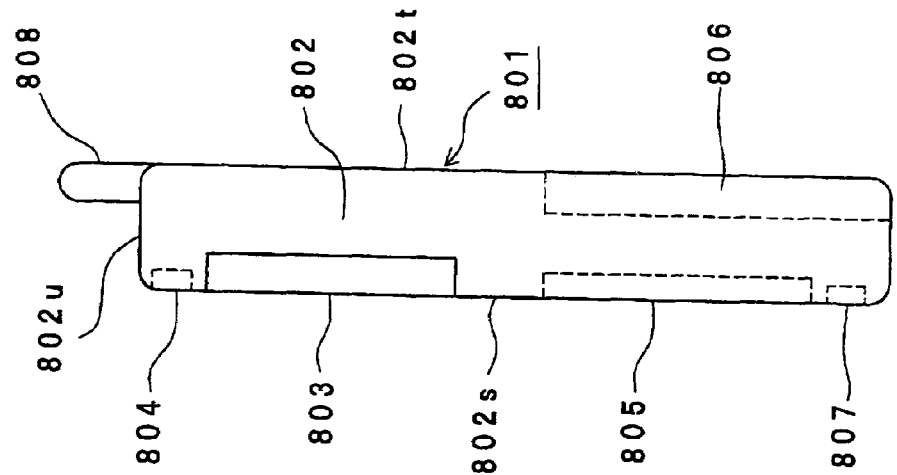
FIGS. 11A and 11B show a configuration example of a straight-type portable radio communication apparatus 801 of an eighth preferred embodiment according to the present invention, where
Figure 11A:
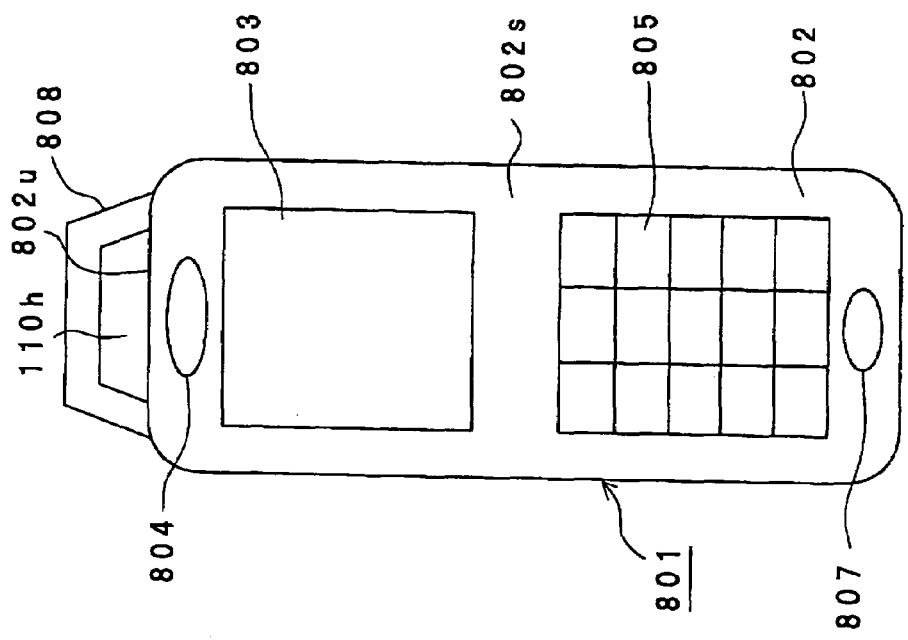

In the first to seventh preferred embodiments described above, the examples of the folding-type portable radio communication apparatus have been described. Alternatively, the boom portion can be formed in a straight-type portable radio communication apparatus. FIGS. 11A and 11B show an example of a straight-type portable radio communication apparatus 801 having a boom portion 808 formed thereon. FIG. 11A is a plan view of the portable radio communication apparatus 801, and FIG. 11B is a side view thereof.

Referring to FIGS. 11A and 11B, the portable radio communication apparatus 801 includes a housing 802 of an approximately rectangular parallelepiped shape. A display 803 which displays information such as characters and images transmitted and received by or stored in the portable radio communication apparatus 801 is provided on the upper side of an operation surface 802s of the housing 802. A speaker (not shown) which outputs speech of the other party during a telephone call is formed on the upper side of the display 803, and a sound hole portion 804 for speaker is formed above the speaker. On the other hand, a keyboard 805 for button input operation is provided on the lower side of the display 803, a microphone 807 is provided on the lower side of the keyboard 805, and a rechargeable battery 806 is provided on a bottom surface 802t of the housing 802 on the opposite side of the operation surface 802s and so as to be opposed to the operation surface 802s.

Further, the boom portion 808 in which an antenna element (not shown) is buried or embedded is coupled with a top surface 802u which couples the operation surface 802s of the housing 802 with the bottom surface 802t thereof. In a manner similar to that of the boom portion 110 shown in FIGS. 1A and 1B, the boom portion 808 is made of a circular cylindrical dielectric member having a larger length than the width of the portable radio communication apparatus 801, and both ends of the boom portion 808 are bent so as to be symmetric with respect to a plane passing through the longitudinal center of the boom portion 808, and are coupled with the top surface 802u of the housing 802. At this time, the boom portion 808 is provided so that the housing 802 of the portable radio communication apparatus 801 including the boom portion 808 is bilaterally symmetric as shown in FIG. 11A and so that the boom portion 808 is parallel to the bottom surface 802t of the housing 802 and coupled therewith out any step when seen from the side of the portable radio communication apparatus 801 as shown in FIG. 11B.

The portable radio communication apparatus 801 of the present preferred embodiment constituted as described above exhibits advantageous effects similar to those of the folding-type portable radio communication apparatuses of the first to seventh preferred embodiments. It is noted that one of the antenna elements described in the first to seventh preferred embodiments may be employed in the boom portion 808.

In the first to eighth preferred embodiments described above, the antenna element is formed in one of the boom portion 110 and 808 made of the dielectric material, so that the resonance frequency of the antenna element can be decreased and the portable radio communication apparatus can be made smaller in size. In addition, by sealing the surrounding of the antenna element using a resin, it is possible to enhance the mechanical strength of each of the boom portion 110 and 808 and the antenna element and improve the mass productivity thereof.

In the first to eighth preferred embodiments described above, the examples of forming the antenna element in each of the boom portion 110 and 808 have been described. However, the present invention is not limited to this, and the antenna element may be arranged in the housing without forming any antenna element in each of the boom portion 110 and 808. Also in this case, it is possible to avoid the conventional disadvantage that the portable radio communication apparatus is caught in his pocket when taking out the portable radio communication apparatus from his pocket.

Ninth Preferred Embodiment

Figure 12A:
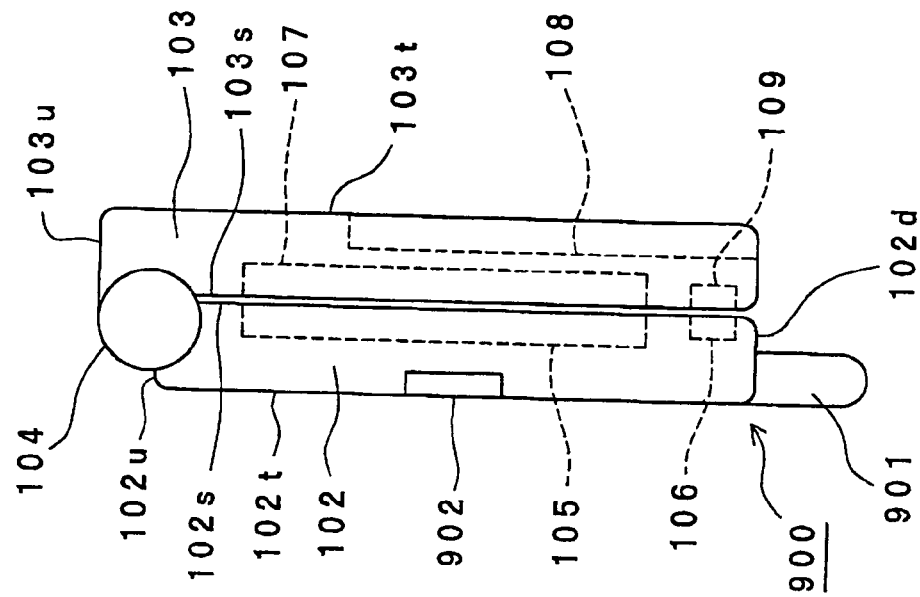
FIGS. 12A and 12B show a configuration example of a folding-type portable radio communication apparatus 900 of a ninth preferred embodiment according to the present invention, where
Figure 12B:
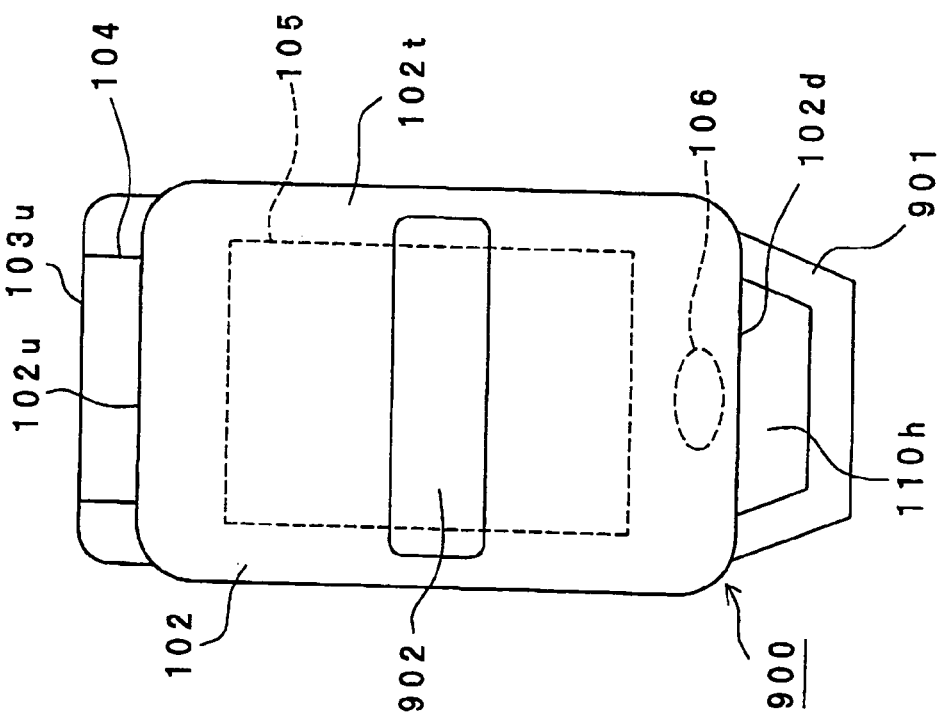

FIG. 12A is a plan view of a portable radio communication apparatus 900 in a folding state of a ninth preferred embodiment according to the present invention, and FIG. 12B is a side view thereof.

Referring to FIGS. 12A and 12B, a boom portion 901 is provided on a bottom surface 102d of the upper housing 102 on which the sound hole portion 106 for speaker is formed above the speaker and which is located on the opposite side of and opposed to the top surface 102u on which the hinge portion 104 is provided. A sub-display 902 is provided in the central portion of the outer surface 102t corresponding to an inner surface 102s of the upper housing 102. For the convenience of description with reference to FIGS. 12A and 12B, the surfaces are denoted as the top surface 102u and the bottom surface 102d, however, it should be noted that the upper and lower relations change according to the state of the use of the portable radio communication apparatus 900.

In the portable radio communication apparatus 900 constituted as described above, the sub-display 902 is mainly used in such a state that the portable radio communication apparatus 900 is folded to display information such as the present time, a state of the intensity of the received radio signal, the residual quantity of a rechargeable battery and a call message. Generally speaking, when the portable radio communication apparatus 900 includes the sub-display 902, it is determined which side is the upper side of the portable radio communication apparatus 900 in a folding state according to the direction of characters and pictures displayed on the sub-display 902. If the sub-display 902 is arranged so that the hinge portion 104 is located on the lower end when the portable radio communication apparatus 900 is folded, the user can see the characters and pictures displayed on the sub-display 902 in a correct direction when the user suspends the portable radio communication apparatus 900 from his neck and holds the portable radio communication apparatus 900 by his hand by arranging the boom portion 901 on the bottom surface 102d on the opposite side of the hinge portion 104 and corresponding to the end portion of the portable radio communication apparatus 900 as described in the present preferred embodiment. It is noted that the antenna element may be formed in the boom portion 901 in a manner similar to that of the above-mentioned first to seventh preferred embodiments.

Figure 13B:
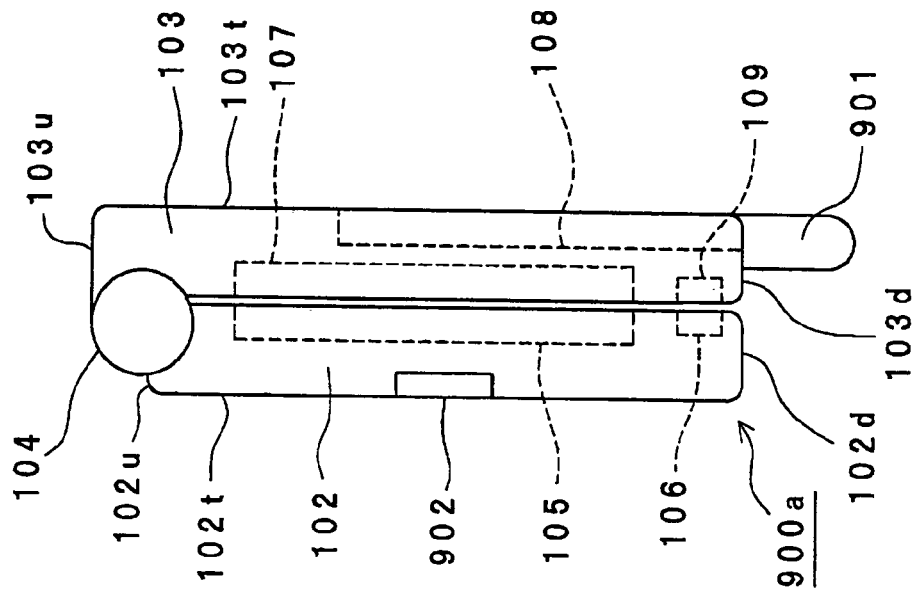
FIGS. 13A and 13B show a configuration example of a folding-type portable radio communication apparatus 900a of a modified preferred embodiment of the ninth preferred embodiment according to the present invention, where
Figure 13A:
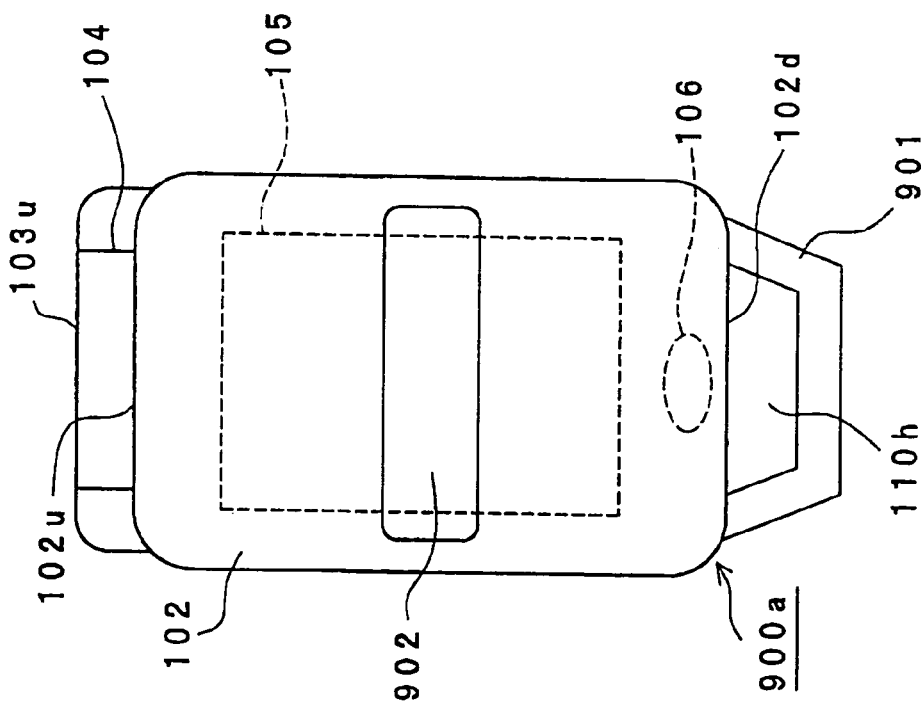

FIG. 13A is a plan view showing an example of a portable radio communication apparatus 900a in a folding state of a modified preferred embodiment of the ninth preferred embodiment according to the present invention, and FIG. 13B is a side view thereof.

Referring to FIGS. 13A and 13B, the portable radio communication apparatus 900a is different from the portable radio communication apparatus 900 of the ninth preferred embodiment in that a boom portion 901 is coupled with the bottom surface 103d of the lower housing 103 which is opposite to the top surface 103u thereof. In this case, in addition to the actions and advantageous effects of the ninth preferred embodiment, it is advantageously possible to decrease a maximum SAR (Specific Absorption Rate) since the boom portion 901 is located on the lower end of the portable radio communication apparatus 900a during a telephone call when the portable radio communication apparatus 900a is opened to be used and the distance between the boom portion 901 and a human body can be set to be relatively larger. Further, in such a state that the user uses the portable radio communication apparatus 900a while gripping the hinge portion 104 thereof or the neighborhood of the hinge portion 104, it is possible to reduce the electromagnetic influence caused by the human body onto the portable radio communication apparatus 900a and to maintain better antenna radiation characteristic during a telephone call.

Tenth Preferred Embodiment

FIG. 14A is a plan view showing an example of a straight-type portable radio communication apparatus 801a in a tenth embodiment according to the present invention, and FIG. 14B is a side view thereof.

Referring to FIGS. 14A and 14B, the portable radio communication apparatus 801a is different from the portable radio communication apparatus 801 of the eighth preferred embodiment in that a boom portion 808a is coupled with a bottom surface 802d of a housing 802 which is opposite a top surface 802u thereof. When an antenna element is formed in the boom portion 808a, the boom portion 808a is located on the lower end of the portable radio communication apparatus 801a during a telephone call. Therefore, the distance between a human body and the portable radio communication apparatus 801a can be set to be relatively larger, so that the maximum value of the SAR can be decreased. Further, when the user uses the portable radio communication apparatus 801a while gripping the neighborhood of the upper portion of the portable radio communication apparatus 801a (the neighborhood of the top surface 802u), it is possible to reduce the electromagnetic influence of the human body onto the portable radio communication apparatus 801a and to maintain better antenna radiation characteristic during a telephone call.

Eleventh Preferred Embodiment

Figure 15:
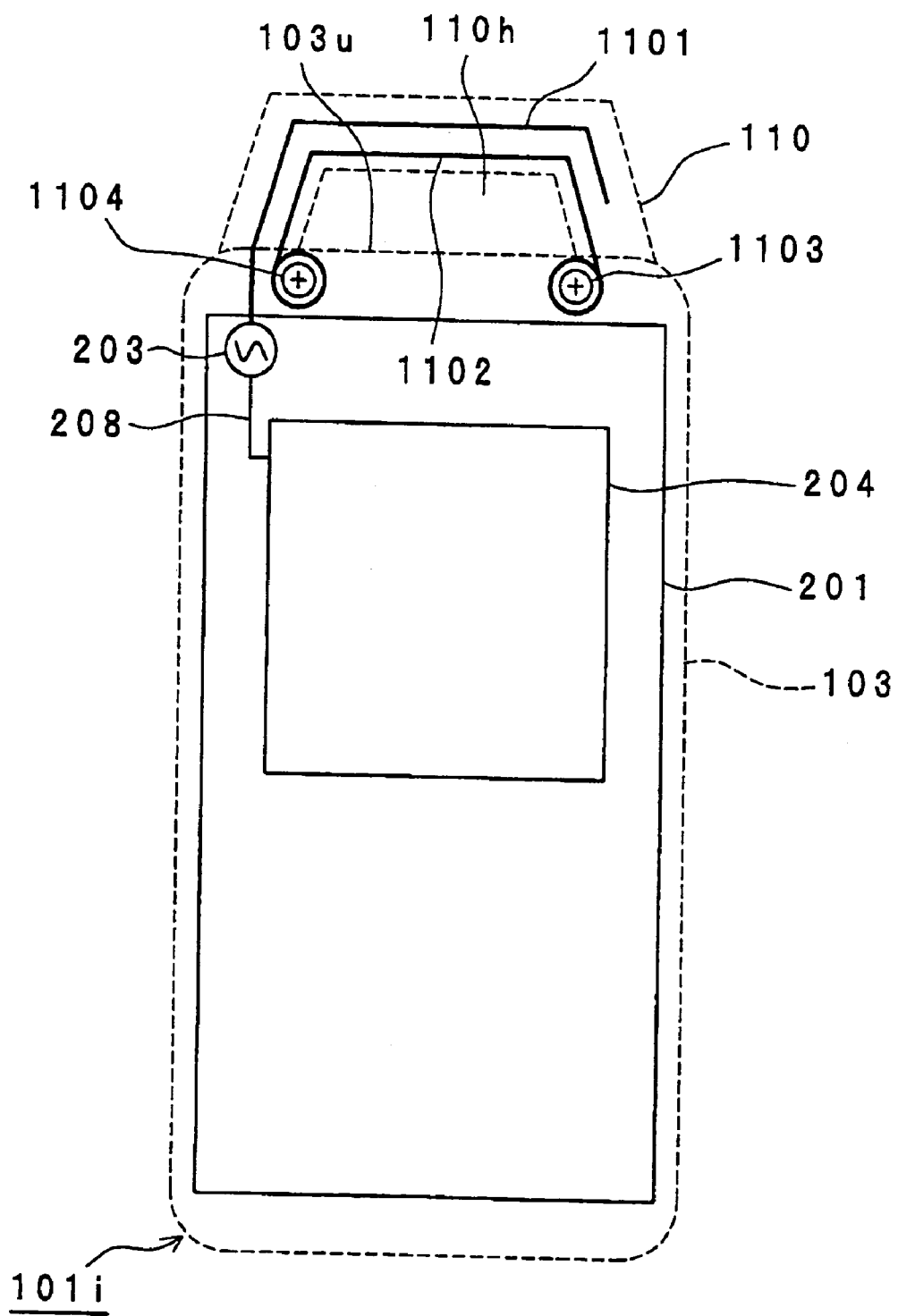
FIG. 15 is a plan view of a portable radio communication apparatus 101i with a perspective view showing a configuration example of the portable radio communication apparatus 101i of an eleventh preferred embodiment according to the present invention.

FIG. 15 is a plan view of a portable radio communication apparatus 101i with a perspective view showing a specific configuration of a lower housing of the portable radio communication apparatus 101i of an eleventh preferred embodiment according to the present invention.

Referring to FIG. 15, an antenna element 1101 which is a monopole antenna having a quarter of the wavelength is formed on the inside of the boom portion 110, one end of the antenna element 1101 is connected with a feeding point 203, and another end thereof is an open end. In addition, the feeding point 203 is connected with a radio communication circuit 204 through a feeding cable 208. Further, a conductor line 1102 is formed on the inside of the boom portion 110 on the side of the lower housing 103 to be apart from the antenna element 1101 by a predetermined distance and along the antenna element 1101. Both ends of the conductor line 1102 are wound around screws 1103 and 1104, respectively, on the inside of the lower housing 103 in the vicinity of the top surface 103u of the lower housing 103, and fixed to the lower housing 103 by the screws 1103 and 1104.

In the portable radio communication apparatus 101i constituted as described above, the strength of the boom portion 110 can be enhanced by the conductor line 1102 and the mass productivity thereof can be improved. Further, by forming the conductor line 1102 to be electromagnetically coupled with the antenna element 1101, the conductor line 1102 can be made to operate as a parasitic element, and this leads to that the directivity of the antenna element 1101 can be changed. In addition to this, by making the conductor line 1102 which is a parasitic element and the antenna element 1101 resonate so as to cover frequency bands different from each other, the portable radio communication apparatus 101i can be made to operate in two frequency bands.

Twelfth Preferred Embodiment

Figure 16:
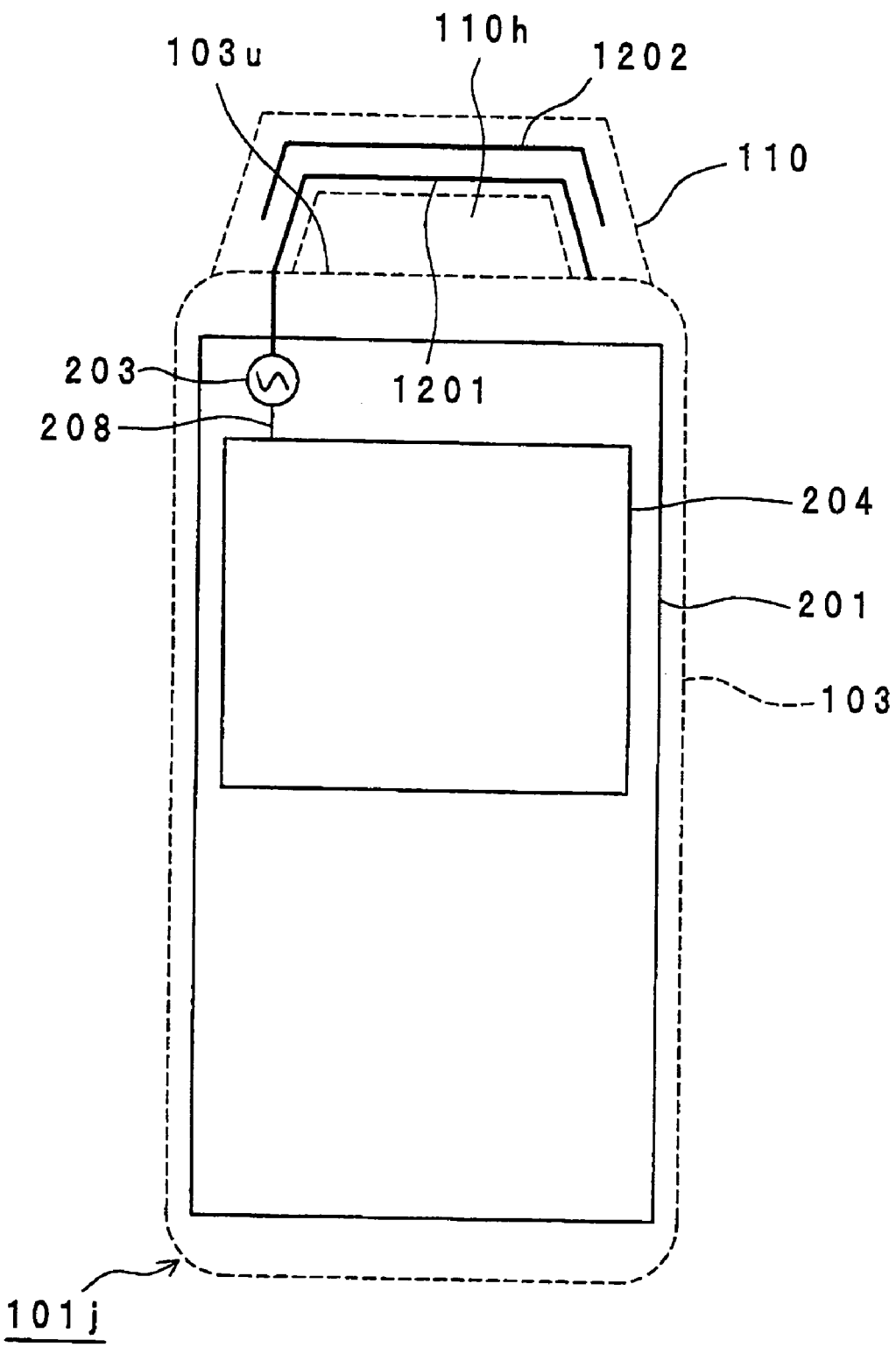
FIG. 16 is a plan view of a portable radio communication apparatus 101j with a perspective view showing a configuration example of the portable radio communication apparatus 101j of a twelfth preferred embodiment according to the present invention.

FIG. 16 is a plan view of a portable radio communication apparatus 101j with a perspective view showing an example of the portable radio communication apparatus 101j of a twelfth preferred embodiment according to the present invention.

Referring to FIG. 16, a conductor line 1202 operating as a parasitic element may be provided on the outside of an antenna element 1201 when seen from the lower housing 103. Also in this case, the present preferred embodiment exhibits advantageous effects similar to those of the eleventh preferred embodiment.

Each of the conductor lines 1102 and 1202 of the eleventh and twelfth preferred embodiments described above may be applied to the portable radio communication apparatus of any of the first to tenth preferred embodiments.

In the preferred embodiments described above, the conductor lines 1102 and 1202 are each formed on the inside of the boom portion 110. However, the present invention is not limited to this, and a part or the whole of the outer surface of the boom portion 110 may be formed of a conductor material such as a magnesium alloy or a zinc alloy instead of the conductor lines 1102 and 1202. Also in this case, the conductor material can be made to operate as a parasitic element. In addition, this conductor material portion may be made to operate as a part of the antenna element 1201 by applying a current thereto. Also in this case, a better antenna radiation pattern can be obtained.

Thirteenth Preferred Embodiment

FIG. 17A is a plan view showing a part of the specific configuration of a portable radio communication apparatus 101k of a thirteenth preferred embodiment according to the present invention, and FIG. 17B is a side view thereof. The portable radio communication apparatus 101k of the present preferred embodiment is different from the portable radio communication apparatus 101 of the first preferred embodiment shown in FIGS. 1A and 1B in that a boom portion 1301 located apart from the lower housing 103 is provided so as to be inclined from the bottom surface 103t of the lower housing 103 so that a central portion 1301a of the boom portion 1301 protrudes from an extension surface of the lower housing 103 from the bottom surface 103t in the direction opposite to the direction toward the hinge portion 104.

According to the portable radio communication apparatus 101k constituted as described above, the boom portion 1301 is provided to be inclined from the bottom surface 103t. Therefore, when the portable radio communication apparatus 101k is put on a flat surface 1300 of a desk, a floor or the like, as shown in FIG. 18, the bottom surface 103t of the lower housing 103 floats from the flat surface 1300 except for the lower end portion thereof. Accordingly, even when the portable radio communication apparatus 101k is dragged across the flat surface 1300, it is possible to prevent the bottom surface 103t of the lower housing 103 from being damaged. Furthermore, since the angle of the portable radio communication apparatus 101k is inclined, a display 105 and a sub-display (not shown in FIG. 18, e.g., the sub-display 902 shown in FIG. 13A) can display images and characters in an easily viewably position even when the portable radio communication apparatus 101k is put on the desk or the like. Further, even when the portable radio communication apparatus 101k is put on a metal plate such as a steel desk, only a central portion 1301a on the tip end of the boom portion 1301 on which the antenna element is formed contacts with the steel desk. It is therefore possible to relatively suppress the deterioration of antenna gain caused by the electromagnetic coupling of the portable radio communication apparatus 101k with the metal plate.

When the boom portion 1301 is constituted of an elastic resin material, as shown in FIG. 18, the boom portion 1301 can absorb a shock when the portable radio communication apparatus 101k is put on the flat surface 1300 and a pressure is applied to the portable radio communication apparatus 101k from the upper side thereof such as inadvertent trampling down of the portable radio communication apparatus 101k. It is therefore advantageously possible to make it more difficult to break down the portable radio communication apparatus 101k.

The boom portion 1301 of the present preferred embodiment described above may be applied to the portable radio communication apparatus of the first to twelfth preferred embodiments.

Fourteenth Preferred Embodiment

Figure 20:
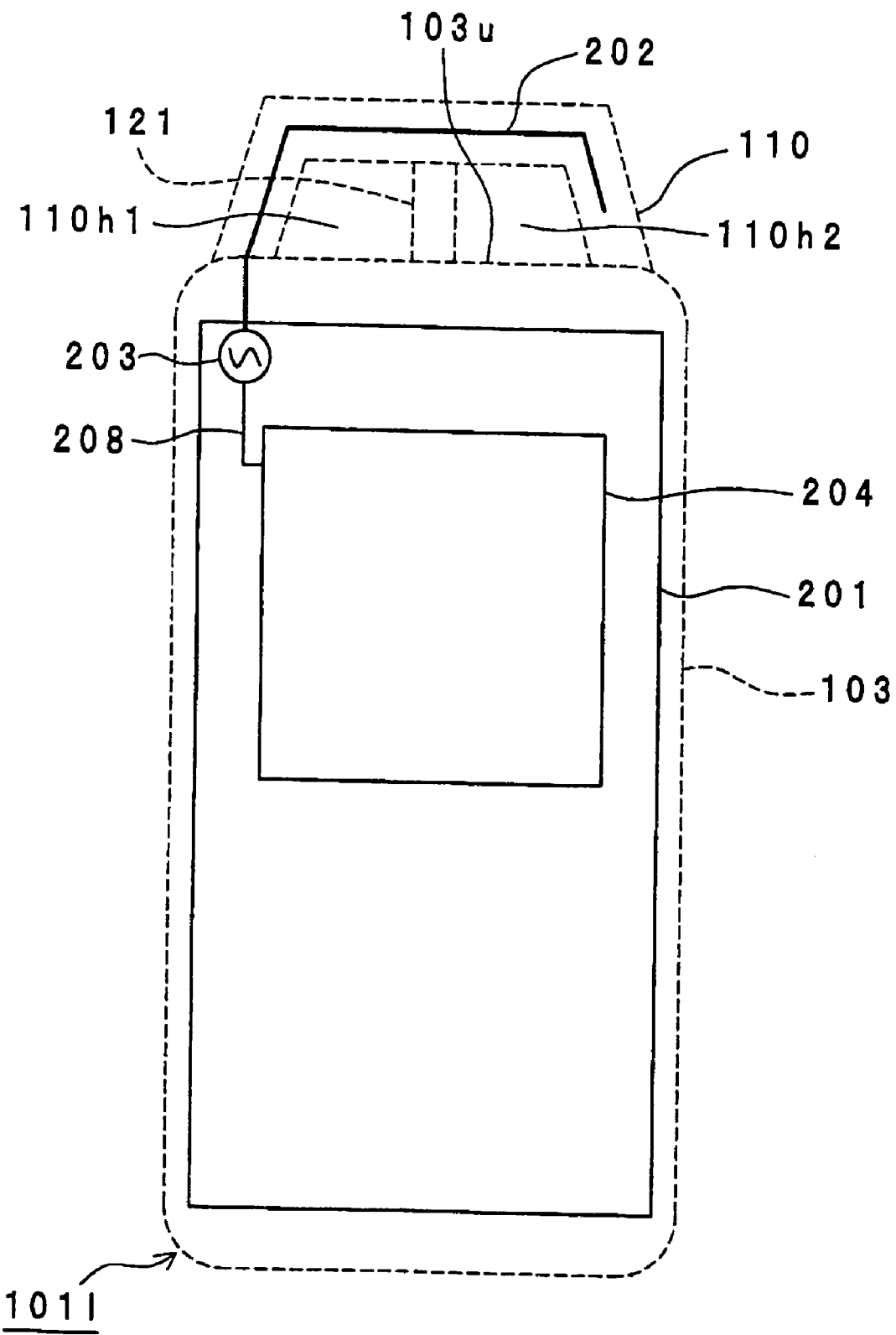
FIG. 20 is a plan view of the portable radio communication apparatus 101l shown in FIGS. 19A and 19B with a perspective view showing a concrete configuration example of a lower housing of the portable radio communication apparatus 101l.

FIG. 19A is a plan view of a portable radio communication apparatus 101l in a folding state of a fourteenth preferred embodiment according to the present invention, and FIG. 19B is a side view thereof. FIG. 20 is a perspective view showing a concrete configuration of the lower housing 103 of the portable radio communication apparatus 101l. As shown in FIGS. 19A and 19B, the portable radio communication apparatus 101l of the present preferred embodiment is characterized, as compared with the portable radio communication apparatus 101 of the first preferred embodiment shown in FIGS. 1A and 1B, by further including the circular cylindrical reinforcement member 121 made of a dielectric which is coupled between the central portion 110c in the longitudinal direction of the boom portion 110 and the central portion 130uc in the widthwise direction of the top surface 103u of the lower housing 103. By providing the reinforcement member 121, a through hole between the boom portion 110 and the lower housing 103 is divided into two through holes 110h1 and 110h2 located to right and left of the reinforcement member 121, respectively.

FIGS. 19A and 19B show an example of the portable radio communication apparatus 101l which does not include other protrusions such as an external antenna or the like. In addition, FIG. 20 shows that the lower substrate 201 is provided on the inside of the lower housing 103 and one end of a monopole antenna element 202 formed on the inside of the boom portion 110 and on the inside of the lower housing 103 is connected with the radio communication circuit 204 through the feeding point 203 and the feeding cable 208.

According to the portable radio communication apparatus 101*l* constituted as described above, by providing the circular cylindrical reinforcement member 121, the ability of the portable radio communication apparatus 101*l* to resist a shock applied to the boom portion 110 can be improved. Therefore, even when the portable radio communication apparatus 101*l* is dropped, it is possible to make it more difficult to break down the portable radio communication apparatus 101*l*. In FIG. 20, it is noted that the monopole antenna element 202 is formed on the inside of the boom portion 110. However, the present invention is not limited to this, and one of the antenna elements of the second to seventh preferred embodiments may be formed. Furthermore, as described above, the antenna element may be constituted by forming a conductor material on a part or the whole of the outer surface of the boom portion 110. This result in enhancement of the mechanical strength of the boom portion 110 can be enhanced, and the portable radio communication apparatus 101*l* can be made to be more durable when the portable radio communication apparatus is dropped in the ground such as a floor.

Fifteenth Preferred Embodiment

FIG. 21A is a plan view showing an example of a portable radio communication apparatus 101*m* of a fifteenth preferred embodiment according to the present invention in a folding state, and FIG. 21B is a side view thereof. As shown in FIGS. 21A and 21B, the portable radio communication apparatus 101*m* of the present preferred embodiment is characterized, as compared with the portable radio communication apparatus 101 of the first preferred embodiment shown in FIGS. 1A and 1B, by further including the circular cylindrical reinforcement member 122 made of the dielectric which is coupled between approximately central portions in the longitudinal directions of both side portions 110*a* and 110*b* of the boom portion 110 except for the central portion 110*c* thereof so as to be substantially parallel to the top surface 103*u* of the lower housing 103. By providing the reinforcement member 122, a through hole between the boom portion 110 and the lower housing 103 is divided into two through holes 110*h*3 and 110*h*4 located above and below the reinforcement member 122, respectively. The portable radio communication apparatus 101*m* of the present preferred embodiment constituted as described above exhibits actions and advantageous effects similar to those of the portable radio communication apparatus 101*l* of the fourteenth preferred embodiment.

It is noted that the reinforcement member 122 may be formed of, for example, a conductor material, so that the present reinforcement member 122 operates as a parasitic element during the operation of an antenna element (not shown) formed on the inside of the boom portion 110.

Each of the reinforcement members 121 and 122 shown in the fourteenth and fifteenth preferred embodiments may be formed integrally with one of the boom portion 110 and the lower housing 103. In this case, it is possible to further remarkably enhance the mechanical strength of the boom portion 110. In addition, the example of constituting the reinforcement members 121 and 122 each of a dielectric material is described, however, the present invention is not limited to this, and each of the reinforcement members 121 and 122 may be formed by using a predetermined alloy.

Sixteenth Preferred Embodiment

FIG. 22A is a plan view of a portable radio communication apparatus 101*n* of a sixteenth preferred embodiment according to the present invention in a folding state, and FIG. 22B is a side view thereof. The portable radio communication apparatus 101*n* of the present preferred embodiment is characterized by including first and second cylindrical reinforcement members 123 and 124 each made of a dielectric instead of the reinforcement member 121 shown in FIG. 19.

Referring to FIG. 22A, portions located on both sides of the boom portion 110 which are in the vicinity of the central portion 110*c* of the boom portion 110 and between which the central portion 110*c* is put are denoted by reference numerals 110*ca* and 110*cb*, respectively, and portions located on both sides of the top surface 103*u* of the lower housing 103 which are in the vicinity of the central portion 103*uc* of the lower housing 103 and between which the central portion 103*uc* is put are denoted by reference numerals 103*uca* and 103*ucb*, respectively. In this case, the first reinforcement member 123 is formed so as to couple the portion 110*ca* of the boom portion 110 with the portion 103*uca* on the top surface 103*u* of the lower housing 103, whereas the second reinforcement member 124 is formed so as to couple the portion 110*cb* of the boom portion 110 with the portion 103*ucb* on the top surface 103*u* of the lower housing 103. Accordingly, a through hole formed between the boom portion 110 and the lower housing 103 is divided into a through hole 110*h*11 located in the central portion in the widthwise direction of the hole and two through holes 110*h*12 and 110*h*13 located on both sides of the through hole 110*h*11.

Figure 23:
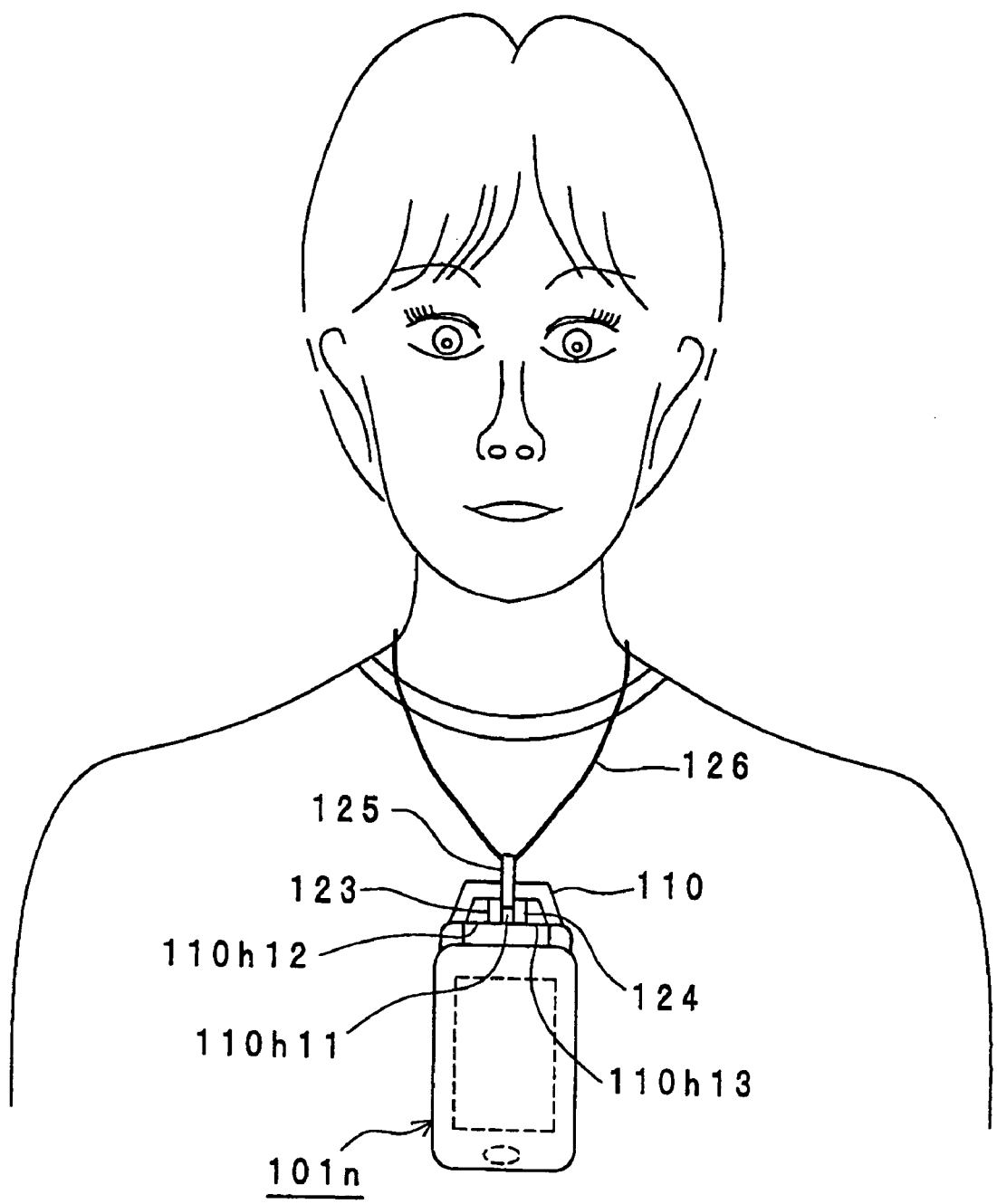
FIG. 23 is a front view showing one example of a case where the portable radio communication apparatus 101n shown in FIGS. 22A and 22B is used when it is suspended from his neck.

When the portable radio communication apparatus 101*n* constituted as described above is held by being suspended from his neck using a cord, a strap or the like, the through hole 110*h*11 is formed in the central portion 110*c* of the boom portion 110 and a strap attachment member 125 for coupling a strap 126 to the portable radio communication apparatus 101*n* can be inserted into the through hole 110*h*11 as shown in FIG. 23. Therefore, when the portable radio communication apparatus 101*n* is suspended from his neck using the strap 126, the portable radio communication apparatus 101*n* can be kept well balanced bilaterally. In this case, the reinforcement members 123 and 124 act as stoppers which prevent the strap attachment member 125, which is inserted into the through hole 110*h*11 of the boom portion 110, from laterally moving in the widthwise direction thereof, so that the portable radio communication apparatus 101*n* can be stably held when the portable radio communication apparatus 101*n* is suspended from his neck.

Seventeenth Preferred Embodiment

FIG. 24A is a plan view showing an example of a portable radio communication apparatus 101*o* of a seventeenth preferred embodiment according to the present invention in a folding state, and FIG. 24B is a side view thereof. As shown in FIGS. 24A and 24B, the portable radio communication apparatus 101*o* of the present preferred embodiment is characterized, as compared with the fourteenth preferred embodiment shown in FIGS. 19A and 19B, by including a V-shaped reinforcement member 127 instead of the circular cylindrical reinforcement member 121 made of a dielectric.

Referring to FIGS. 24A and 24B, a V-shaped lower end portion 127*a* of the reinforcement member 127 is coupled with the central portion 103*uc* on the top surface 103*u* of a lower housing 103, and two V-shaped upper end portions 127*b* and 127*c* of the reinforcement member 127 are coupled with portions 110*ca* and 110*cb* which are in the vicinity of the central portion 110*c* of the boom portion 110 and which are located on both sides of the central portion 110*c*, respectively. This leads to an arrangement in which a through hole formed between the boom portion 110 and the lower housing 103 is divided into a through hole 110h21 located in the central portion in the widthwise direction of the through hole and formed between the reinforcement member 127 and the boom portion 110, and two through holes 110h22 and 110h23 located on both sides of the through hole 110h21. The portable radio communication apparatus 110o of the present preferred embodiment constituted as described above exhibits actions and advantageous effects similar to those of the fourteenth preferred embodiment, and can remarkably improve the sense of beauty thereof.

In the preferred embodiments described above, the cases of using one or two reinforcement members 121, 122, 123, 124 and 127 have been described. However, the present invention is not limited to this, and three or more reinforcement members may be used. Further, by constituting each of the reinforcement members 121, 122, 123, 124, and 127 of an electrically conductive material such as magnesium or zinc instead of the dielectric, each of these reinforcement members 121, 122, 123, 124, and 127 can be made to operate as a parasitic element. In this case, the directivity of the antenna can be changed and the antenna can be resonated in a plurality of frequency bands. Moreover, as described above, when the antenna element is formed in the boom portion 110 made of the dielectric, the resonance frequency of the antenna element can be lowered and the antenna element formed in the boom portion 110 can be made smaller in size. In addition, by sealing the surrounding of the antenna using a resin material for the boom portion 110, the mechanical strength of the boom portion 110 and the antenna element can be enhanced and the mass productivity thereof can be further improved.

Each of the reinforcement members 123, 124 and 127 shown in the sixteenth and seventeenth preferred embodiments may be formed integrally with one of the boom portion 110 and the lower housing 103. In this case, the mechanical strength of the boom portion 110 can be further enhanced. Further, the examples of constituting each of the reinforcement members 123, 124 and 127 of a dielectric material have been described. However, the present invention is not limited to this, and each of the reinforcement members 123, 124 and 127 may be formed by using a predetermined alloy.

Eighteenth Preferred Embodiment

Figure 26:
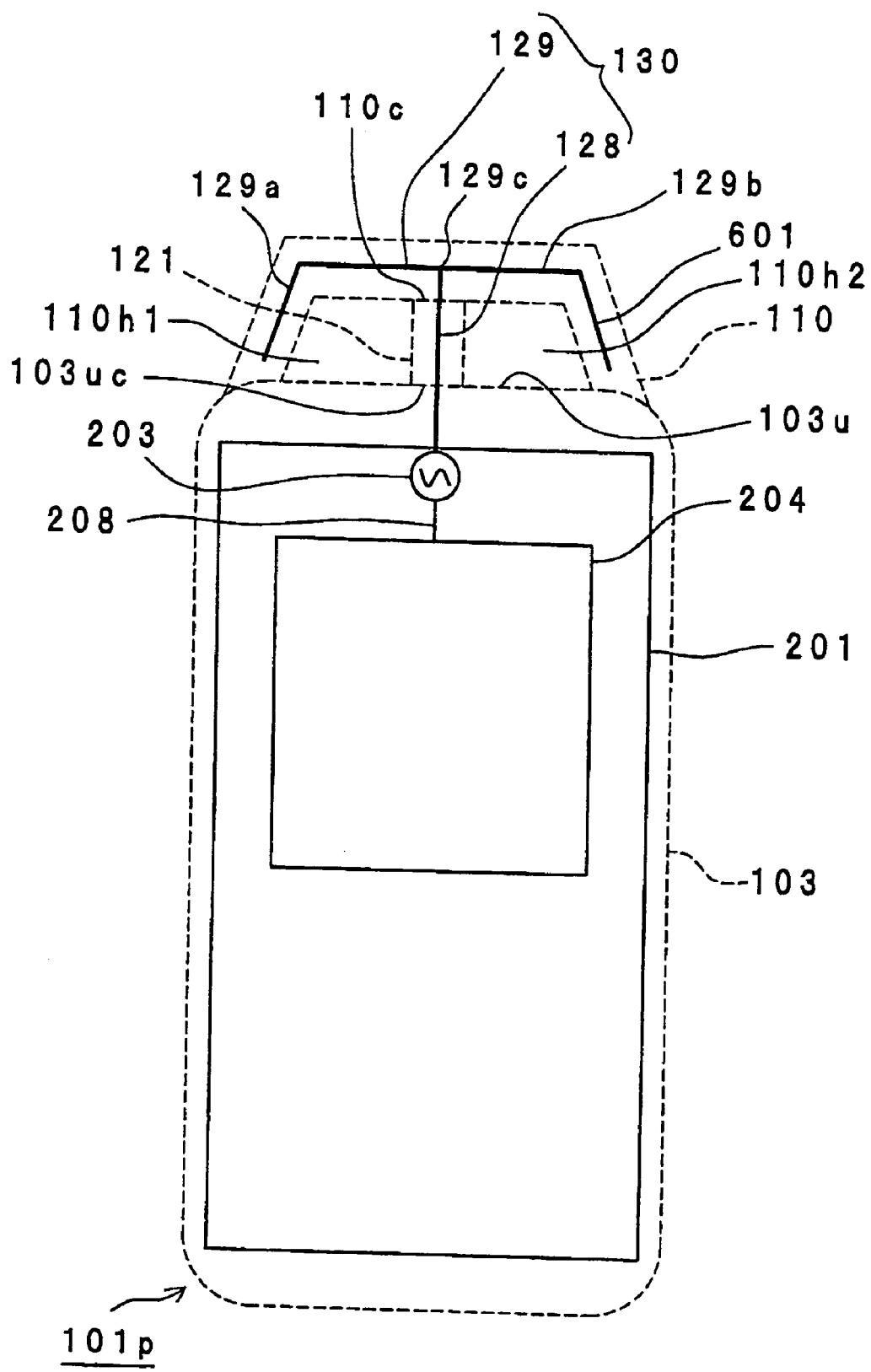
FIG. 26 is a plan view of the portable radio communication apparatus 101p shown in FIGS. 25A and 25B with a perspective view showing an example of a lower housing of the portable radio communication apparatus 101p.

FIG. 25A is a plan view showing a portable radio communication apparatus 101p of an eighteenth preferred embodiment according to the present invention in a folding state, and FIG. 25B is a side view thereof. FIG. 26 is a perspective view showing a part of the configuration of a lower housing 103 of the portable radio communication apparatus 101p. As shown in FIG. 26, the portable radio communication apparatus 101p of the present preferred embodiment is characterized, as compared with the portable radio communication apparatus 101l of the fourteenth preferred embodiment shown in FIG. 20, by including an approximately T-shaped antenna element 130 instead of the monopole antenna element 202.

Referring to FIG. 26, the antenna element 130 is constituted by including a horizontal antenna portion 129 that is buried or embedded in the boom portion 110 and a vertical antenna portion 128 that is buried or embedded in the reinforcement member 121, and the horizontal antenna portion 129 is divided into a left antenna portion 129a and a right antenna portion 129b with a connection point 129c located as a boundary point between the antenna portion 129 and the antenna portion 128. The connection point 129c is connected with the radio communication circuit 204 through the antenna portion 128, the feeding point 203 and the feeding cable 208.

In the antenna element 130 constituted as described above, the antenna portions 128 and 129a operate as a first monopole antenna having a quarter of the wavelength, and the antenna portions 128 and 129b operate as a first monopole antenna having a quarter of the wavelength. Accordingly, the antenna element 130 operates as a two-resonance antenna including the two monopole antennas. With this configuration employed, the mechanical strengths of the boom portion 110 and the reinforcement member 121 can be enhanced. Further, by using the reinforcement member 121 as a member containing an antenna element, the degree of freedom upon designing of the antenna can be improved and the desired antenna characteristic can be easily obtained. In addition, by arranging the feeding point 203 in the vicinity of the widthwise center of the portable radio communication apparatus 101p, the antenna element 130 can be made to have almost a bilaterally symmetric structure. In this case, when the user holds the portable radio communication apparatus 101p by the hand during a telephone call or the like, it is possible to obtain almost the same antenna characteristic in both cases of the right and left hands.

In the present preferred embodiment, the particular example of the portable radio communication apparatus 101p in which the reinforcement member 121 is arranged in the vicinity of the widthwise central portion of the portable radio communication apparatus 101p has been described. However, the present invention is not limited to this, and the antenna element may be formed at least in the reinforcement member 121. Furthermore, in the present preferred embodiment, the case of forming the antenna element in one reinforcement member 121 has been described. However, the present invention is not limited to this. Two or more reinforcement members may be provided, and the antenna element may be formed such that a part of the antenna element is buried or embedded in each of the reinforcement members. In addition, one of the reinforcement members of the fourteenth to eighteenth preferred embodiment may be formed in any of the portable radio communication apparatuses of the first to thirteenth preferred embodiments.

Nineteenth Preferred Embodiment

Figure 27B:
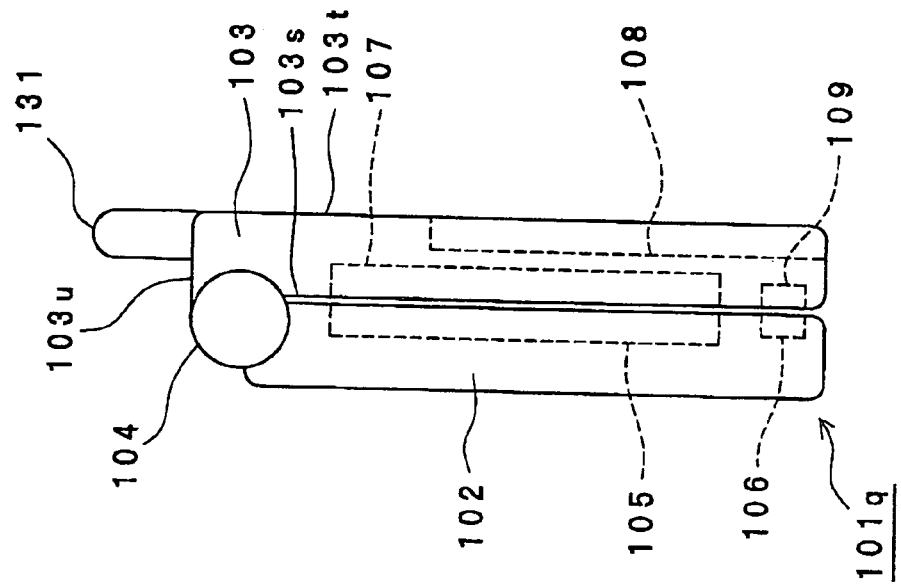
FIGS. 27A and 27B show a configuration example of a folding-type portable radio communication apparatus 101q of a nineteenth preferred embodiment according to the present invention, where
Figure 27A:
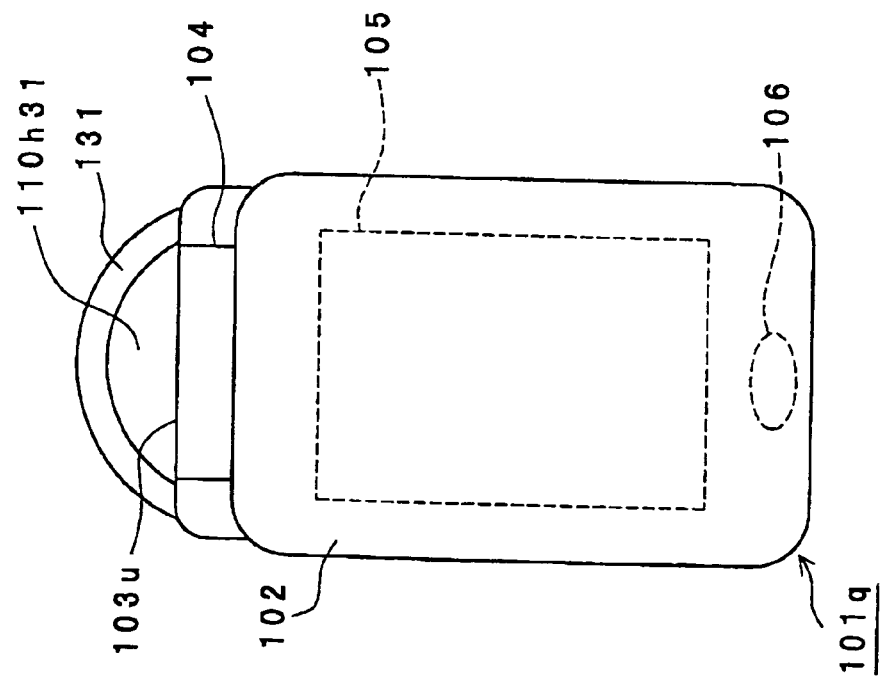

FIG. 27A is a plan view showing a portable radio communication apparatus 101q of a nineteenth preferred embodiment according to the present invention in a folding state, and FIG. 27B is a side view thereof. As shown in FIGS. 27A and 27B, the portable radio communication apparatus 101q of the present preferred embodiment is characterized, as compared with the first preferred embodiment shown in FIGS. 1A and 1B, by including a boom portion 131 of arched shape (shape of a part of a circular arc) made of a circular cylindrical dielectric instead of the circular cylindrical boom portion 110 bent at two portions. In this case, a through hole 110h31 is formed between the boom portion 131 and the top surface 130u of the lower housing 103.

Since the arched boom portion 131 is provided in the preferred embodiment constituted described above, it is possible to enhance the mechanical strength of the boom portion 131 as compared with the boom portion 110 bent at two portions. In addition, when the portable radio communication apparatus 101q is held by being suspended from his neck, the portable radio communication apparatus 101q can be suspended in a well-balanced manner, and the sense of beauty thereof can be further improved. In the present preferred embodiment, the case of not using any reinforcement member has been described. However, the present invention is not limited to this. One or more reinforcement members of the fourteenth to eighteenth preferred embodiments may be further provided in the portable radio communication apparatus 101q of the present preferred embodiment, so that the mechanical strength can be further enhanced.

Twentieth Preferred Embodiment

FIG. 28A is a plan view showing a portable radio communication apparatus 101r of a twentieth preferred embodiment according to the present invention in a folding state, and FIG. 28B is a side view thereof. As shown in FIGS. 28A and 28B, the portable radio communication apparatus 101r of the present preferred embodiment is characterized, as compared with the nineteenth preferred embodiment shown in FIGS. 27A and 27B, by including an arched boom portion 132 made of a dielectric and having a width and a height changed from the arched boom portion 131 made of a circular cylindrical dielectric instead of the arched boom portion 131. In this case, a through hole 110h32 is formed between the boom portion 132 and the top surface 130u of the lower housing 103.

Referring to FIGS. 28A and 28B, the thickness of a central portion 132c of the boom portion 132 is set to t1, the width of the central portion 132c on a plane vertical to a thickness direction is set to w1, and the thickness and width in the neighborhood of each end portions of the boom portion 132 coupled with the top surface 130u of the lower housing 103 are set to t2 and w2, respectively. In this case, as shown in FIG. 28A, by forming the boom portion 132 so that the width w2 is larger than the width w1, the mechanical strength in the neighborhood of the coupled portion in which the boom portion 132 is coupled with the lower housing 103 can be enhanced, and the ability of the portable radio communication apparatus 101r to resist damage when dropped can be improved. Further, as shown in FIG. 28B, by constituting the boom portion 132 so that the thickness t2 is larger than the thickness t1, the mechanical strength in the neighborhood of the coupled portion in which the boom portion 132 is coupled with the lower housing 103 can be enhanced. In addition, by forming the boom portion 132 so that the thickness of the boom portion 132 is smoothly changed in a tapered manner from t2 to t1, the boom portion 132 has a shape of a gradual arch so as to make it possible to remarkably improve the sense of beauty thereof.

In the preferred embodiment described above, the case of not using any reinforcement member has been described. However, the present invention is not limited to this, and the portable radio communication apparatus may include one or more reinforcement members described in the fourteenth to eighteenth preferred embodiments. This results in the mechanical strength being further enhanced. In addition, in the preferred embodiment described above, the example of the portable radio communication apparatus in which both the width and thickness of the boom portion 132 are larger than those in the neighborhood of the center of the boom portion 132 near the coupled portion in which the boom portion 132 is coupled with the lower housing 103 has been shown. However, the present invention is not limited to this. Even when one of the width and thickness of the boom portion 132 is changed, the portable radio communication apparatus exhibits similar advantageous effects.

Twenty-First Preferred Embodiment

FIGS. 29A and 29B show a configuration example of a folding-type portable radio communication apparatus 101s of a twenty-first preferred embodiment according to the present invention. FIG. 29A is a plan view of the portable radio communication apparatus 101s, and FIG. 29B is a side view of the portable radio communication apparatus 101s. As shown in FIGS. 29A and 29B, the portable radio communication apparatus 101s of the present preferred embodiment is characterized as follows.

(1) The portable radio communication apparatus 101s includes an isosceles trapezoidal strap attachment portion 133 made of an approximately plate-shaped dielectric instead of the isosceles trapezoidal strap attachment portion 110a made of a parallel plate-shaped dielectric and shown in FIG. 4A. In the strap attachment portion 133, the thickness of a central portion 133c thereof is set to t1, and the thickness in the neighborhood of the lower side thereof which is coupled with the top surface 130u of the lower housing 103 is set to t2. In this case, as shown in FIG. 29B, the strap attachment portion 133 is formed so that the thickness t2 is larger than the thickness t1.

(2) An elliptic through hole 133h for passing a strap therethrough is formed in the central portion 133c of the strap attachment portion 133.

According to the preferred embodiment constituted as described above, the mechanical strength in the neighborhood of a coupled portion in which the strap attachment portion 133 is coupled with the lower housing 103 can be enhanced, and the durability of the portable radio communication apparatus 101r can be improved. Furthermore, by forming the strap attachment portion 133 so as to smoothly change the thickness of the strap attachment portion 133 from t2 to t1 in a tapered manner, the shape of the strap attachment portion 133 when viewed from its side surface is not merely rectangular, and this leads to that the sense of beauty thereof can be improved. In addition, the through hole 133h is formed in the vicinity of the central portion 133c of the strap attachment portion 133. Therefore, when a strap or the like is passed through the through hole 133h so as to suspend the portable radio communication apparatus 101s from his neck, the moving range of the strap can be narrowed, and the portable radio communication apparatus 101s can be stably held. In addition, according to the example shown in FIGS. 29A and 29B, the strap can be directly attached to the strap attachment portion 133 without employing any special tool such as the strap attachment member 125 shown in FIG. 23.

Figure 30A:
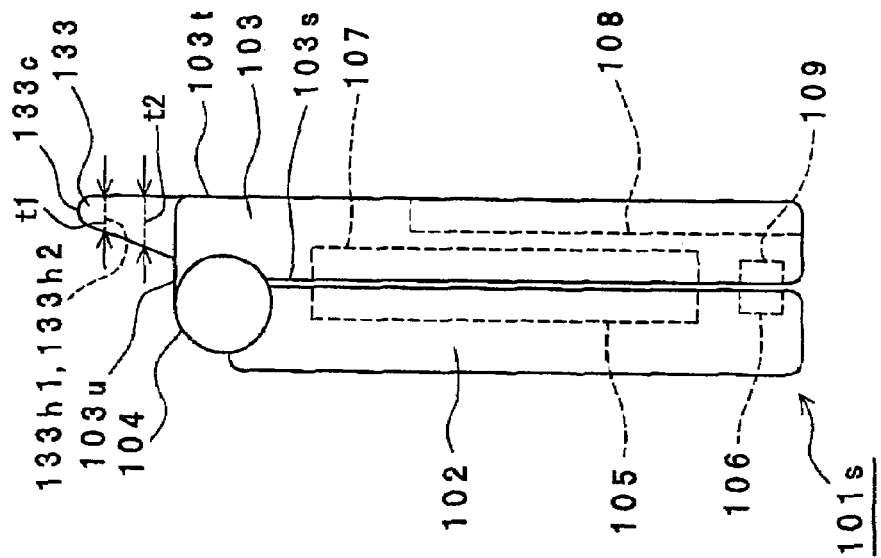
FIGS. 30A and 30B show a configuration example of a folding-type portable radio communication apparatus 101s of a modified preferred embodiment of the twenty-first preferred embodiment according to the present invention, where
Figure 30B:
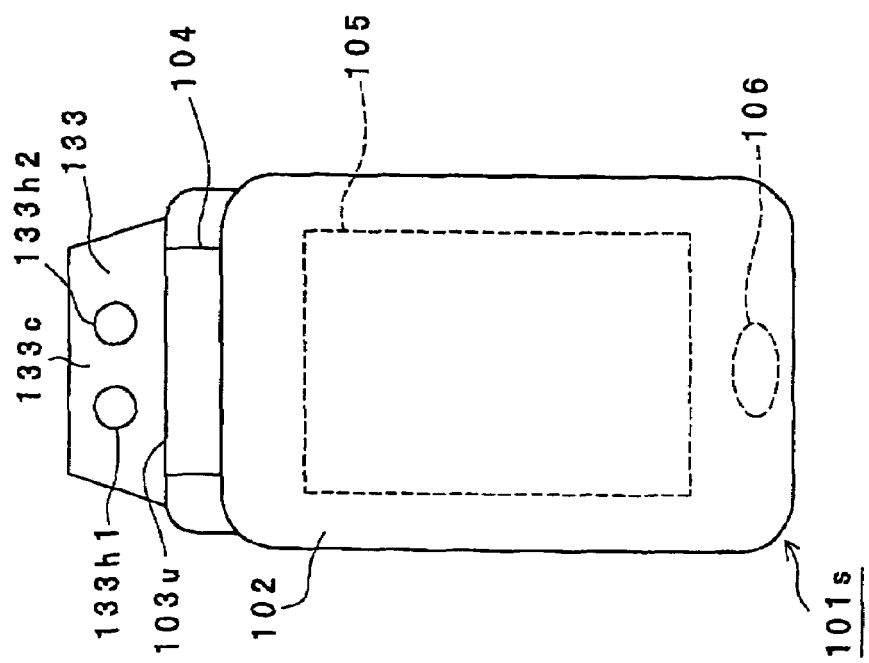

FIGS. 30A and 30B show a configuration example of a folding-type portable radio communication apparatus 101s of a modified preferred embodiment of the twenty-first preferred embodiment according to the present invention. FIG. 30A is a plan view of the portable radio communication apparatus 101s, and FIG. 30B is a side view of the portable radio communication apparatus 101s. As shown in FIGS. 30A and 30B, the portable radio communication apparatus 101s of the present modified preferred embodiment is characterized, as compared with the twenty-first preferred embodiment shown in FIGS. 29A and 29B, in that two circular through holes 133h1 and 133h2 are formed to be aligned in the widthwise direction in the vicinity of the central portion of an approximately trapezoidal strap attachment portion 133 instead of the one elliptic through hole 133h.

The present modified preferred embodiment exhibits actions and advantageous effects similar to those of the portable radio communication apparatus 101s shown in FIGS. 29A and 29B. In addition, according to the example of FIGS. 30A and 30B, a strap can be directly attached to the strap attachment portion 133 without employing any special tool such as the strap attachment member 125 shown in FIG. 23.

The strap attachment portion 133 of any of the nineteenth to twenty-first preferred embodiments described above may be applied to the portable radio communication apparatuses of the first to eighteenth preferred embodiments.

Twenty-Second Preferred Embodiment

FIG. 31A is a plan view showing a portable radio communication apparatus 101t of a twenty-second preferred embodiment according to the present invention in a folding state, and FIG. 31B is a side view thereof. FIG. 32A is a back view of the portable radio communication apparatus 101t, FIG. 32B shows the specific example of a boom portion 141 in such a state that the boom portion 141 is detached from the portable radio communication apparatus 101t, FIG. 32C is a top view showing a specific example of each of screw portions 142a and 142b that fixedly mount the boom portion 141 onto a lower housing 103 of the portable radio communication apparatus 101t, and FIG. 32D is a side view of each of the screw portions 142a and 142b. As shown in FIGS. 31A, 31B, and 32A to 32D, the portable radio communication apparatus 101t of the present preferred embodiment is characterized in that both ends of the boom portion 141 are fixedly fitted into the lower housing 103 using the screw portions 142a and 142b, respectively, as compared with the boom portion 110 shown in FIG. 1.

Referring to FIG. 32A, both ends of the boom portion 141 are coupled with the top surface 103u of the lower housing 103 by the screw portions 142a and 142b, respectively. At this time, screw grooves (threads) 103na and 103nb, corresponding to the screw portions 142a and 142b, are formed in portions of the lower housing 103 which the screw portions 142a and 142b are screwed in, respectively. In addition, as shown in FIGS. 32C and 32D, the neighborhood of the central portion in the axial direction of each of the screw portions 142a and 142b forms a space 142c, and a screw groove (thread) 142n is formed on the outside of the space 142n. Further, a groove 142d is formed in the head portion of each of the screw portions 142a and 142b so that the screw portions 142a and 142b can be screwed by a screwdriver or the like. As shown in FIG. 32B, the screw portions 142a and 142b are provided on the both end portions of the boom portion 141, respectively, and diameters of the both end portions of the boom portion 141 are formed larger than the diameters of the spaces of the screw portions 142a and 142b so that the screw portions 142a and 142b do not detach from the boom portion 141, respectively.

In the portable radio communication apparatus 101t constituted as described above, since the interior of each of the screw portions 142a and 142b respectively formed on the end portions of the boom portion 141 forms the space 142c, the portable radio communication apparatus 101t can be axially rotated in such a state so as to fix the boom portion 141. It is therefore possible to detach the boom portion 141 from the portable radio communication apparatus 101t with a screwdriver or the like and attach boom portions 141 having different sizes, colors and shapes to the portable radio communication apparatus 101t, respectively.

In the preferred embodiment described above, the example of the portable radio communication apparatus 101t in which the boom portion 141 is coupled with the lower housing 103 by the screw portions 142a and 142b has been described. However, the present invention is not limited to this, and various coupling means may be used to couple the boom portion 141 with the lower housing 103. Further, in the present preferred embodiment, the case of not using any reinforcement member has been described. However, the present invention is not limited to this. The portable radio communication apparatus 101t may include one or more reinforcement members described above, so that the mechanical strength of the portable radio communication apparatus 101t can be further enhanced.

When the size of the boom portion 141 is changed, the size of an antenna element provided on the surface or on the inside of the boom portion 141 can be changed. For example, a large-sized antenna element can be arranged in the large-sized boom portion 141, and the antenna element in the boom portion 141 can be made to operate as an antenna having high gain and a wide band. Furthermore, since the distance between the head of a human body and the antenna element can be widened during a telephone call, it is possible to reduce the deterioration of antenna radiation characteristic due to the influence of the human body.

The detachable boom portion 141 of the present preferred embodiment may be applied to any of the portable radio communication apparatuses of the first to twenty-first preferred embodiments. In addition, in the fourteenth to twenty-second preferred embodiments, the configuration examples of the folding-type portable radio communication apparatuses have been described. Alternatively, the boom portion or strap attachment portion described in each of the preferred embodiments may be formed on a straight-type portable radio communication apparatus. Moreover, by forming an antenna element on the inside of the boom portion shown in each of the fourteenth to twenty-second preferred embodiments, the resonance frequency of the antenna element can be lowered, and this enables the portable radio communication apparatus to be made smaller in size. In addition, by sealing the surrounding of the antenna using a resin, the mechanical strength of the boom portion and the antenna portion can be enhanced and the mass productivity thereof can be improved. Moreover, in the fourteenth to twenty-second preferred embodiments, the configuration examples in which the antenna element is formed on the inside of the boom portion have been described. However, the present invention is not limited to this. The antenna element may be formed not on the inside of the boom portion but on the inside of the housing of the portable radio communication apparatus. Also in this case, such a conventional disadvantage that the portable radio communication apparatus is caught in his pocket when the portable radio communication apparatus is taken out of his pocket can be avoided. Further, the configurations and shapes of the boom portions shown in the fourteenth to twenty-second preferred embodiments are not limited to those shown therein. As long as at least the boom portion includes one through hole and is shaped to be able to pass a cord such as a strap or the like therethrough, actions and advantageous effects similar to those of the fourteenth to twenty-second preferred embodiments can be exhibited.

As described above in detail, the present invention can provide the portable radio communication apparatus which can prevent the user from feeling uncomfortable even when the user puts the portable radio communication apparatus in his pocket while maintaining better antenna radiation pattern, which can constitute the portable radio communication apparatus to be bilaterally symmetric so as to be suspended in a well-balanced manner when the user suspends the portable radio communication apparatus from his neck, and which has both good performance and good design.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A portable radio communication apparatus comprising:
   a housing containing a radio communication circuit;
   a projection portion having a first end portion connected to said housing, a second end portion connected to said housing, and a central portion located between the first and second end portions, said projection portion configured to project from said housing at an obtuse angle thereto;
   a grounding conductor arranged in said housing; and
   an antenna element connected to the radio communication circuit through a feeding point above said grounding conductor,
   wherein at least one part of said antenna element is mounted in at least one of an inner part and a surface of said projection portion,
   wherein an unbalanced antenna is formed by the antenna element and the grounding conductor, and
   wherein, when said housing is supported on a flat surface, a surface of said housing opposes the flat surface and is floated from the flat surface by said projection portion so as to form the obtuse angle between said projection portion and the surface of said housing, thereby separating the grounding conductor of said antenna element from the flat surface, and suppressing any deterioration of antenna gain due to electromagnetic coupling of the grounding conductor with the flat surface.

2. The portable radio communication apparatus as claimed in claim 1, wherein the central portion of said projection portion extends in parallel to a width direction of said portable radio communication apparatus, and the first and second end portions are bent from opposite ends of the central portion, respectively.

3. The portable radio communication apparatus as claimed in claim 1, wherein said projection portion is shaped as an arch.

4. The portable radio communication apparatus as claimed in claim 1, wherein a thickness of each of said first and second end portions of said projection portion is larger than a thickness of the central portion of said projection portion.

5. The portable radio communication apparatus as claimed in claim 1, wherein a width of each of the first and second end portions of said projection portion is larger than a width of the central portion of said projection portion.

6. The portable radio communication apparatus as claimed in claim 1, wherein said projection portion is detachably connected to said housing.

7. The portable radio communication apparatus as claimed in claim 1, wherein said projection portion is made of a dielectric.

8. The portable radio communication apparatus as claimed in claim 7, wherein said projection portion is made of a dielectric which is an elastic resin material.

9. The portable radio communication apparatus as claimed in claim 1, wherein said projection portion is made of a conductor material.

10. The portable radio communication apparatus as claimed in claim 1, wherein said projection portion is a boom portion.

11. The portable radio communication apparatus as claimed in claim 1, wherein said projection portion is made of a member that is formed separately from said housing.

12. The portable radio communication apparatus as claimed in claim 1, wherein, when said housing is supported on a flat surface by the central part of the projection portion and an end portion of said housing, a surface of said housing opposes the flat surface and is separated from the flat surface by said projection portion, thereby separating the feeding point of said antenna element from the flat surface.

13. A portable radio communication apparatus comprising:
    a housing containing a radio communication circuit;
    a projection portion having a first end portion connected to said housing, a second end portion connected to said housing, and a central portion located between the first and second end portions,
    wherein said projection portion projects from an end surface of said housing so as to be inclined away from a first surface of said housing which is different from the end surface of said housing;
    an antenna element connected to said radio communication circuit, wherein at least a part of said antenna element is disposed in a part of said projection portion, and
    a reinforcement member between said projection portion and said housing, wherein at least one part of said antenna element is provided in said reinforcement member.

14. The portable radio communication apparatus as claimed in claim 13, wherein said antenna element includes a helical conductor.

15. The portable radio communication apparatus as claimed in claim 13, wherein said antenna element includes a meander conductor.

16. A portable radio communication apparatus comprising:
    a housing containing a radio communication circuit;
    a projection portion having a first end portion connected to said housing, a second end portion connected to said housing, and a central portion located between the first and second end portions,
    wherein said projection portion projects from an end surface of said housing so as to be inclined away from a first surface of said housing which is different from the end surface of said housing;
    an antenna element connected to said radio communication circuit, wherein at least a part of said antenna element is disposed in a part of said projection portion, and
    a parasitic element, wherein at least one part of said parasitic element is provided on one of an interior and an exterior part of said projection portion.

17. The portable radio communication apparatus as claimed in claim 16, wherein said parasitic element is disposed outwardly of said antenna element.

18. The portable radio communication apparatus as claimed in claim 16, wherein said parasitic element is disposed inwardly of said antenna element.

19. The portable radio communication apparatus as claimed in claim 18, wherein said meander conductor is formed so as to be bent three-dimensionally.

* * * * *